United States Patent
Bosua et al.

(10) Patent No.: US 10,375,789 B2
(45) Date of Patent: *Aug. 6, 2019

(54) DIRECTIONAL LIGHTING SYSTEM AND METHOD

(71) Applicant: LIFI Labs, Inc., San Francisco, CA (US)

(72) Inventors: Phillip Anthony Bosua, San Francisco, CA (US); Marc Alexander, San Francisco, CA (US)

(73) Assignee: LIFI Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,458

(22) Filed: Dec. 8, 2017

(65) Prior Publication Data

US 2018/0103522 A1 Apr. 12, 2018

Related U.S. Application Data

(63) Continuation of application No. 15/458,212, filed on Mar. 14, 2017, now Pat. No. 9,883,563, which is a
(Continued)

(51) Int. Cl.
*H05B 33/08* (2006.01)
*H05B 37/02* (2006.01)
(Continued)

(52) U.S. Cl.
CPC ......... *H05B 33/0854* (2013.01); *F21K 9/232* (2016.08); *F21V 23/0442* (2013.01);
(Continued)

(58) Field of Classification Search
CPC ............ H05B 37/0218; H05B 37/0272; H05B 33/0842; H05B 33/0845; H05B 33/0896;
(Continued)

(56) References Cited

U.S. PATENT DOCUMENTS

| 4,942,386 A | 7/1990 | Willis |
| 5,710,545 A | 1/1998 | Dunn |

(Continued)

FOREIGN PATENT DOCUMENTS

| CN | 101897236 | 11/2010 |
| CN | 201986217 | 9/2011 |

(Continued)

*Primary Examiner* — Vibol Tan
(74) *Attorney, Agent, or Firm* — Jeffrey Schox; Diana Lin

(57) ABSTRACT

The method of spatial lightbulb operation includes determining the position of the lightbulb relative to a physical space, detecting a contextual event, determining a spatial lighting pattern associated with the contextual event, and selectively controlling lightbulb light emitting elements based on the position of the lightbulb and the spatial lighting pattern. A lightbulb including: a plurality of individually controlled light emitting elements mounted in fixed, predetermined positions on the substrate; a light sensor mounted to the substrate; a wireless communication module; and a processor configured to: index each light emitting element; progress each of the plurality of light emitting elements through an orientation pattern; associate a reference point on the lightbulb with an external reference point; and selectively operate individual light emitting elements of the plurality according to lighting instructions, based on a relationship between the reference point on the lightbulb and the external reference point.

20 Claims, 13 Drawing Sheets

Related U.S. Application Data continuation of application No. 14/920,020, filed on Oct. 22, 2015, now Pat. No. 9,635,737, which is a continuation of application No. 14/720,180, filed on May 22, 2015, now Pat. No. 9,198,262.

(60) Provisional application No. 62/063,038, filed on Oct. 13, 2014, provisional application No. 62/002,102, filed on May 22, 2014.

(51) Int. Cl.
| | |
|---|---|
| *F21V 23/04* | (2006.01) |
| *F21K 9/232* | (2016.01) |
| *F21Y 115/10* | (2016.01) |
| *F21Y 113/13* | (2016.01) |
| *F21K 9/238* | (2016.01) |
| *F21K 9/235* | (2016.01) |

(52) U.S. Cl.
CPC ..... *H05B 33/0845* (2013.01); *H05B 33/0848* (2013.01); *H05B 33/0869* (2013.01); *H05B 33/0872* (2013.01); *H05B 37/029* (2013.01); *H05B 37/0218* (2013.01); *H05B 37/0245* (2013.01); *H05B 37/0272* (2013.01); *F21K 9/235* (2016.08); *F21K 9/238* (2016.08); *F21Y 2113/13* (2016.08); *F21Y 2115/10* (2016.08)

(58) Field of Classification Search
CPC ................ H05B 37/02; H05B 37/0227; H05B 33/0869; H05B 33/0872; F21Y 2215/10; F21Y 9/238

See application file for complete search history.

(56) References Cited

U.S. PATENT DOCUMENTS

| | | |
|---|---|---|
| 5,769,527 A | 6/1998 | Taylor et al. |
| 5,841,428 A | 11/1998 | Jaeger et al. |
| 5,914,669 A | 6/1999 | Wicks et al. |
| 6,003,206 A | 12/1999 | Hall et al. |
| 6,624,368 B2 | 9/2003 | Sato et al. |
| 6,726,112 B1 | 4/2004 | Ho |
| 6,759,966 B1 | 7/2004 | Weng |
| 7,103,460 B1 | 9/2006 | Breed |
| 7,205,495 B2 | 4/2007 | Mazur |
| 7,221,271 B2 | 5/2007 | Reime |
| 7,339,128 B2 | 3/2008 | Yen |
| 7,418,392 B1 | 8/2008 | Mozer et al. |
| 7,446,671 B2 | 11/2008 | Giannopoulos et al. |
| 7,474,632 B2 | 1/2009 | Ban |
| 7,573,208 B2 | 8/2009 | Newman, Jr. |
| 7,597,455 B2 | 10/2009 | Smith et al. |
| 7,598,885 B2 | 10/2009 | Kwon et al. |
| 7,667,163 B2 | 2/2010 | Ashworth et al. |
| 7,859,398 B2 | 12/2010 | Davidson et al. |
| 7,884,556 B2 | 2/2011 | Gandhi |
| 7,952,322 B2 | 5/2011 | Partovi et al. |
| 7,980,726 B2 | 7/2011 | Joosen et al. |
| 8,035,320 B2 | 10/2011 | Sibert |
| 8,100,552 B2 | 1/2012 | Spero |
| 8,115,369 B2 | 2/2012 | Kang et al. |
| 8,195,313 B1 | 6/2012 | Fadell et al. |
| 8,207,821 B2 | 6/2012 | Roberge et al. |
| 8,253,344 B2 | 8/2012 | Guest et al. |
| 8,282,250 B1 | 10/2012 | Dassanayake et al. |
| 8,294,379 B2 | 10/2012 | Liu et al. |
| 8,299,719 B1 | 10/2012 | Moshirnoroozi |
| 8,314,566 B2 | 11/2012 | Steele et al. |
| 8,373,360 B2 | 2/2013 | Leung et al. |
| 8,433,530 B2 | 4/2013 | Shimada et al. |
| 8,446,288 B2 | 5/2013 | Mizushima et al. |
| 8,523,410 B2 | 9/2013 | Hashimoto et al. |
| 8,562,158 B2 | 10/2013 | Chien |
| 8,581,512 B2 | 11/2013 | Hamamoto et al. |
| 8,593,073 B2 | 11/2013 | Aldrich et al. |
| 8,641,241 B2 | 2/2014 | Farmer |
| 8,723,434 B2 | 5/2014 | Watson et al. |
| 8,723,794 B2 | 5/2014 | Corson et al. |
| 8,742,694 B2 | 6/2014 | Bora et al. |
| 8,743,023 B2 | 6/2014 | Maxik et al. |
| 8,755,561 B2 | 6/2014 | Vlutters et al. |
| 8,760,370 B2 | 6/2014 | Maxik et al. |
| 8,760,514 B2 | 6/2014 | Chien |
| 8,764,251 B2 | 7/2014 | Lien |
| 8,788,966 B2 | 7/2014 | Josephson et al. |
| 8,812,827 B2 | 8/2014 | Malasani |
| 8,820,984 B2 | 9/2014 | Gillio |
| 8,829,799 B2 | 9/2014 | Recker et al. |
| 8,834,009 B2 | 9/2014 | Chien |
| 8,858,029 B2 | 10/2014 | Brandes et al. |
| 8,888,306 B2 | 11/2014 | Thomas et al. |
| 8,890,435 B2 | 11/2014 | Bora et al. |
| 8,902,049 B2 | 12/2014 | Fushimi et al. |
| 8,960,940 B2 | 2/2015 | Hellkamp |
| 8,981,913 B2 | 3/2015 | Henig et al. |
| 8,994,276 B2 | 3/2015 | Recker et al. |
| 9,030,120 B2 | 5/2015 | Pickard et al. |
| 9,049,756 B2 | 6/2015 | Klusmann et al. |
| 9,074,736 B2 | 7/2015 | Recker et al. |
| 9,113,528 B2 | 8/2015 | Bora et al. |
| 9,172,917 B1 | 10/2015 | Fu et al. |
| 9,192,032 B2 | 11/2015 | Kwag et al. |
| 9,247,625 B2 | 1/2016 | Recker et al. |
| 9,326,359 B2 | 4/2016 | Bosua |
| 9,338,864 B2 | 5/2016 | Bosua et al. |
| 9,345,098 B2 | 5/2016 | Joseph et al. |
| 9,351,378 B2 | 5/2016 | Aggarwal et al. |
| 9,408,282 B1 | 8/2016 | Springer |
| 9,526,151 B2 | 12/2016 | Kreiner et al. |
| 9,534,773 B1 | 1/2017 | Turudic |
| 9,538,619 B2 | 1/2017 | Swatsky et al. |
| 9,578,722 B2 | 2/2017 | Feng et al. |
| 9,651,243 B1 | 5/2017 | Springer |
| 9,677,755 B1* | 6/2017 | Linnell ............... F21V 33/0052 |
| 9,936,566 B2* | 4/2018 | Alexander ......... H05B 37/0272 |
| 10,047,912 B2* | 8/2018 | Bosua ..................... F21V 29/83 |
| 10,085,331 B2* | 9/2018 | Alexander ......... H05B 37/0245 |
| 10,129,965 B2* | 11/2018 | Bosua ............... H05B 37/0272 |
| 10,136,292 B2* | 11/2018 | Bosua ....................... G05F 1/12 |
| 2008/0106887 A1 | 5/2008 | Salsbury et al. |
| 2009/0146982 A1 | 6/2009 | Thielman et al. |
| 2009/0251127 A1 | 10/2009 | Kim |
| 2009/0295310 A1 | 12/2009 | Duerr et al. |
| 2010/0068899 A1 | 3/2010 | Shvili |
| 2010/0296285 A1 | 11/2010 | Chemel et al. |
| 2011/0309769 A1 | 12/2011 | Kuroki et al. |
| 2012/0126699 A1 | 5/2012 | Zittel |
| 2012/0195053 A1 | 8/2012 | Wu |
| 2012/0206050 A1 | 8/2012 | Spero |
| 2013/0038230 A1 | 2/2013 | Brown et al. |
| 2013/0148341 A1 | 6/2013 | Williams |
| 2013/0278132 A1 | 10/2013 | Yuan et al. |
| 2014/0084809 A1 | 3/2014 | Catalano |
| 2014/0285999 A1 | 9/2014 | Luna et al. |
| 2014/0300293 A1 | 10/2014 | Ruan et al. |
| 2015/0015165 A1 | 1/2015 | Engelen et al. |
| 2015/0084513 A1 | 3/2015 | Anthony et al. |
| 2015/0103515 A1* | 4/2015 | Bosua ..................... F21V 29/83 |
| | | 362/157 |
| 2015/0141755 A1 | 5/2015 | Tesar |
| 2015/0189721 A1 | 7/2015 | Karc et al. |
| 2015/0208900 A1 | 7/2015 | Vidas et al. |
| 2016/0100086 A1 | 4/2016 | Chien |
| 2017/0163439 A1* | 6/2017 | Bosua ................... H04W 76/11 |
| 2017/0231072 A1* | 8/2017 | Bosua ................... H05B 39/041 |

FOREIGN PATENT DOCUMENTS

| | | |
|---|---|---|
| CN | 102573220 | 7/2012 |
| CN | 203099410 | 7/2013 |

* cited by examiner

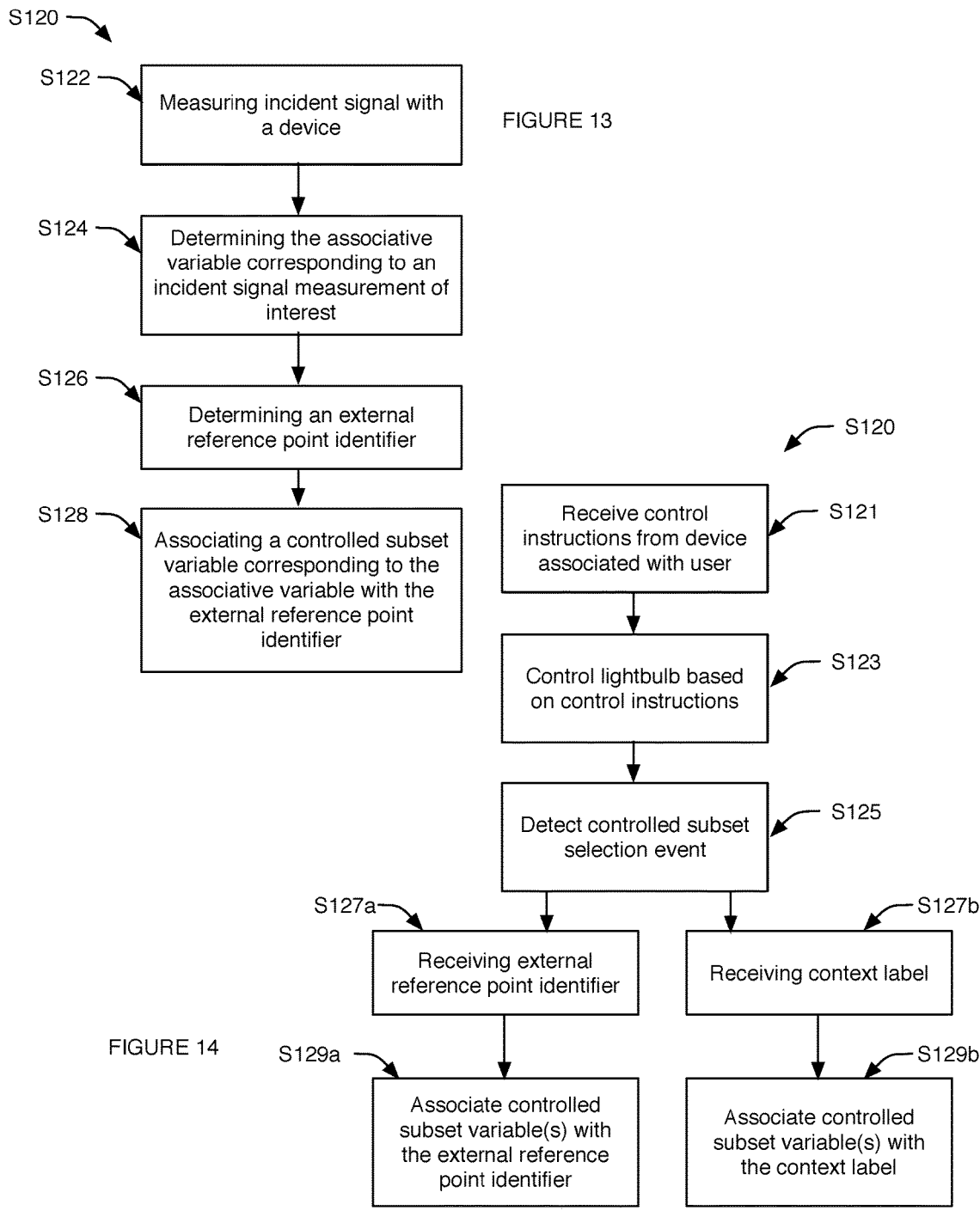

DIRECTIONAL LIGHTING SYSTEM AND METHOD

CROSS-REFERENCE TO RELATED APPLICATIONS

This application is a continuation of co-pending U.S. patent application Ser. No. 15/458,212, filed 14 Mar. 2017, which is a continuation of U.S. patent application Ser. No. 14/920,020, filed 22 Oct. 2015, which is a continuation of U.S. patent application Ser. No. 14/720,180, filed 22 May 2015, which claims the benefit of U.S. Provisional Application Nos. 62/002,102 filed 22 May 2014, and 62/063,038 filed 13 Oct. 2014, which are incorporated in their entireties by this reference.

This application is related to U.S. application Ser. No. 14/425,266 filed 2 Mar. 2015, U.S. application Ser. No. 14/512,669 filed 13 Oct. 2014, and U.S. application Ser. No. 14/542,312 filed 14 Nov. 2014, which are incorporated in their entirety by this reference.

TECHNICAL FIELD

This invention relates generally to the lighting field, and more specifically to a new and useful responsive lighting system and method in the lighting field.

BRIEF DESCRIPTION OF THE FIGURES

FIG. 13 is a flowchart representation of a first variation of determining a lightbulb position using signals emitted during the orientation process, including automatically determining the lightbulb position using a device.

FIG. 14 is a flowchart representation of a first variation of determining a lightbulb position using signals emitted during the orientation process, including manually or pseudo-manually determining the lightbulb position.

DESCRIPTION OF THE PREFERRED EMBODIMENTS

Figure 1:
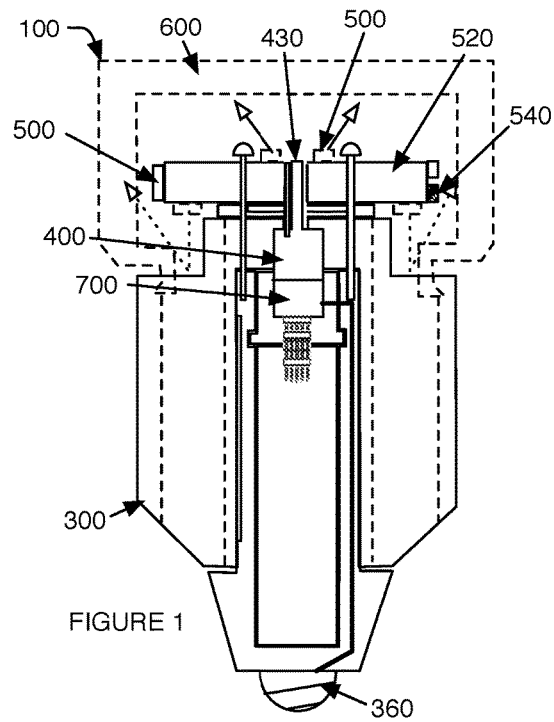
FIG. 1 is a cutaway schematic representation of a first example of the lightbulb, wherein the lightbulb includes sensors enclosed within the lightbulb by the diffuser.

The following description of the preferred embodiments of the invention is not intended to limit the invention to these preferred embodiments, but rather to enable any person skilled in the art to make and use this invention.

1. System.

As shown in FIGS. 1-6, the directional lightbulb 100 includes a light emitting element 500 mounted in a fixed position on the lightbulb 100, a communication module 400, and a processor 700 electrically connected to the light emitting element 500 and the communication module 400. The lightbulb 100 can additionally include a set of sensors 540 connected to the processor 700, a substrate 520 supporting the light emitting element 500 and sensors 540, and/or a diffuser 600 enclosing the light bulb components. However, the lightbulb 100 can include any other suitable set of components.

Figure 17:
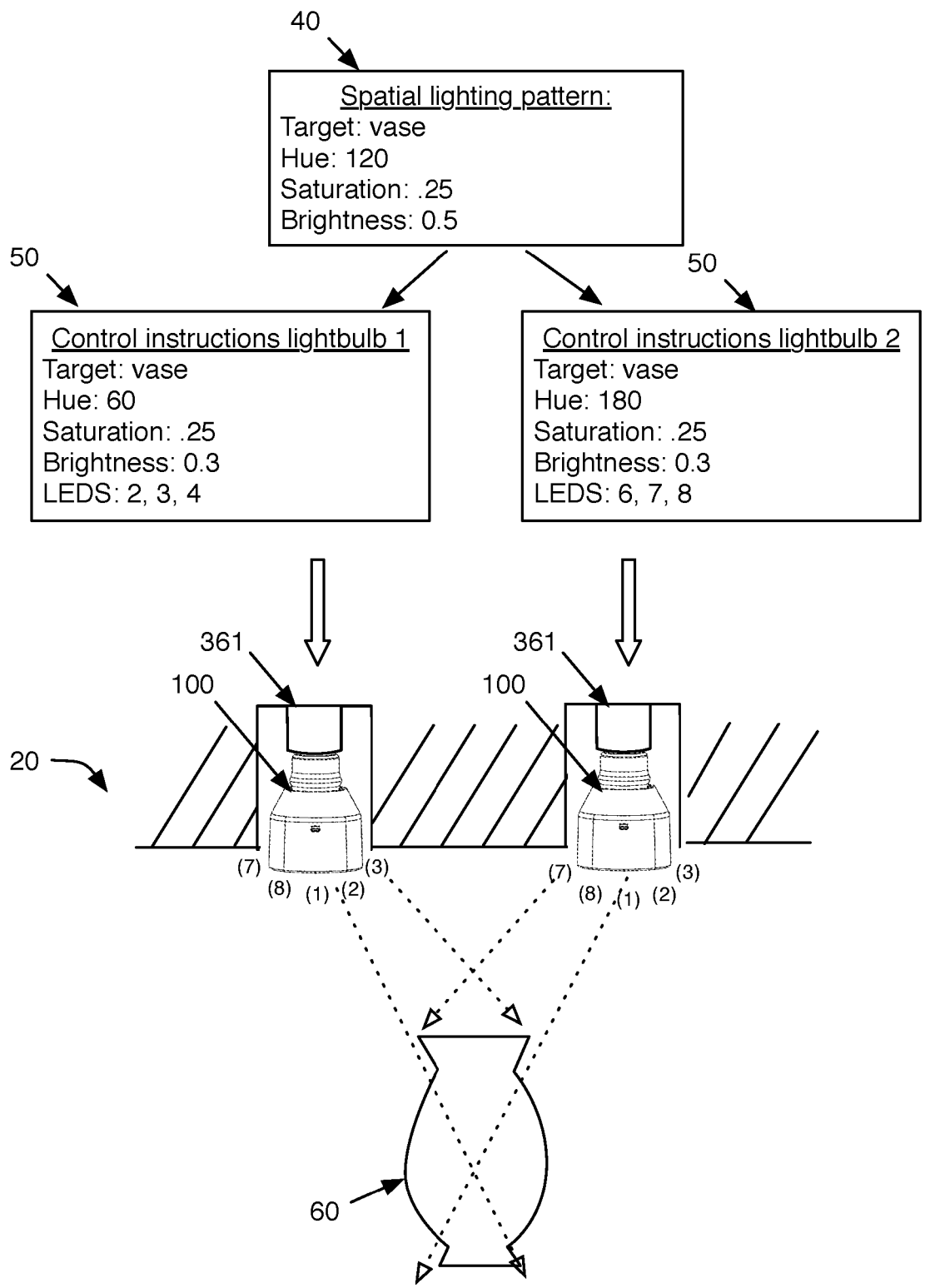
FIG. 17 is a schematic representation of an example of selective, cooperative lightbulb operation based on the spatial lighting pattern.

The lightbulb 100 functions to selectively direct light relative to an external reference point 22, such as toward a desired illumination target 60. The lightbulb 100 preferably performs the method described below, but can alternatively be operated in any other suitable manner. The lightbulb 100 preferably enables light direction adjustment while the lightbulb 100 remains powered and physically connected to the power source, but can alternatively enable light direction adjustment after lightbulb 100 shutoff, cessation of power provision to the circuit to which the lightbulb 100 is connected, or enable light direction adjustment in any other suitable operation state. In a first variation, the lightbulb 100 directs light by selectively operating (e.g., selectively powering or turning on) individual light emitting elements positioned at select locations on the lightbulb 100. The selectively controlled light emitting elements 500 are preferably those closest the desired illumination target 60, but can alternatively be other light emitting elements 500. In this variation, the lightbulb position can be fixed within a lighting fixture 361 (e.g., a standard lighting fixture, such as a ceiling fixture, as shown in FIG. 17), and the light emitting elements 500 can be fixed in known positions on the lightbulb 100.

In a second variation, the lightbulb 100 selectively directs light by moving a powered light emitting element 500 (e.g., via the pivoted support 560) to point toward the desired illumination target 60. In this variation, the lightbulb 100 can be retained within a fixed lighting fixture, such that the lightbulb 100 moves the light emitting element 500 relative to the lightbulb base 360, or be retained within a movable lighting fixture, such that the lightbulb 100 controls an external actuation mechanism to move the entire lightbulb 100. However, the lightbulb 100 can otherwise direct light toward a desired illumination target 60.

This lightbulb 100 can confer several benefits over conventional lightbulbs 100. First, the lightbulb 100 can reduce energy consumption by selectively powering only the light emitting elements 500 that are needed. Second, the same lightbulb 100 can provide multiple different ranges of lighting angles. This can function to reduce the need to install additional lighting fixtures and lightbulbs 100 that selectively direct light toward different illumination targets 60.

Third, the lightbulb 100 can determine and store its rotational and/or geographic position relative to an external reference point 22. This relative orientation or position can subsequently be used to determine the position of the desired illumination target 60 relative to a reference point on the lightbulb 100, and to determine each light emitting element's position relative to the desired illumination target 60. The lightbulb 100 can be capable of rotationally orienting or geographically positioning itself using only the light emitting elements 500 and wireless communication system, using only the light emitting elements 500 and an ambient light sensor, using only the wireless communication system, or using any other suitable combination of components to rotationally or geographically orient itself in any other suitable manner. The lightbulb 100 rotational and/or geographic position can be automatically determined or manually determined. The lightbulb 100 rotational and/or geographic position can be determined solely by the lightbulb 100, cooperatively determined with a user device, cooperatively determined with other similar lightbulbs 100, or otherwise determined. Because the lightbulb 100 is mounted to a lighting fixture, which is typically static, the lightbulb 100 rotational and/or geographic position can be stored and reliably used for subsequent lighting events after initial position determination. Furthermore, in some lightbulb 100 variants including orientation or position sensors (e.g., accelerometers, gyroscopes, GPS systems, etc.), detection of movement beyond a threshold change (e.g., above 0.1 m/s$^2$, 0.5 m/s$^2$, 5 m/s$^2$, 50 m/s$^2$, etc.) can trigger position re-determination. However, the lightbulb 100 orientation can be re-determined in response to switching of a reset switch, sudden cessation and/or power supply, or in response to any other suitable reset event.

Figure 15:
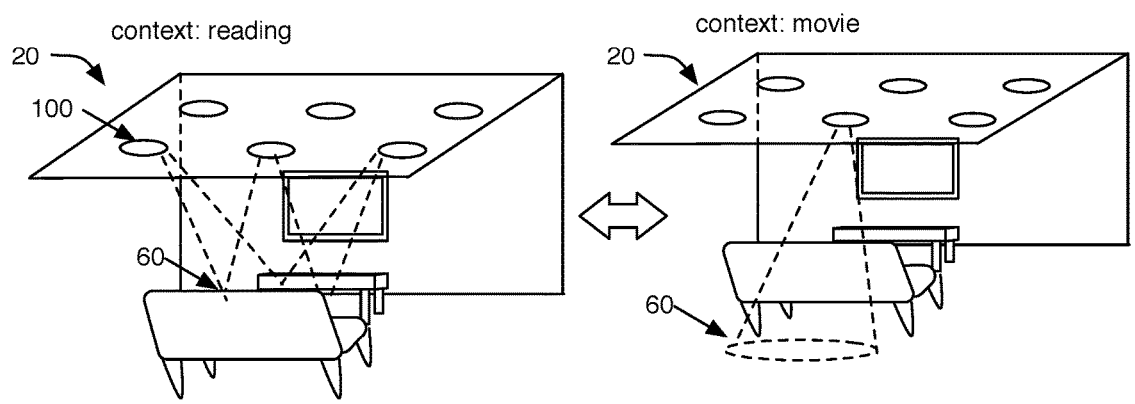
FIG. 15 is a schematic representation of a first example of selective lightbulb operation based on context, including cooperatively illuminating a first illumination target (a seating area) in a first context (reading), and cooperatively illuminating a second illumination target (a physical region behind the seating area) in a second context (movie).
Figure 16:
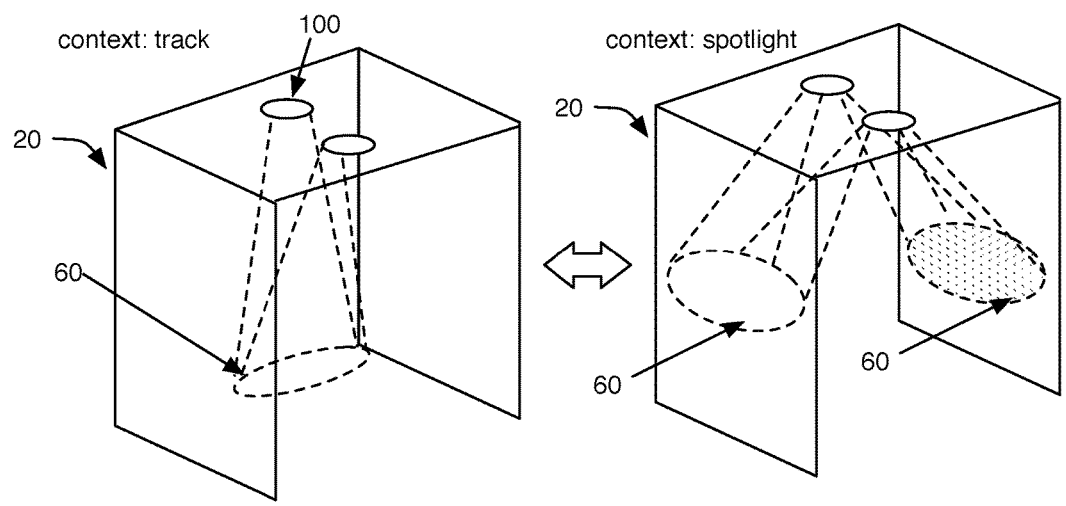
FIG. 16 is a schematic representation of a second example of selective lightbulb operation based on context, including cooperatively illuminating a first illumination target (the hallway) in a first context (tracking), and cooperatively illuminating a second illumination target (features on the walls) in a second context (spotlight).

Fourth, the lightbulb 100 can provide context-responsive lighting. In a first example, as shown in FIG. 16, the same lightbulb 100 (or plurality of lightbulbs 100 can anticipatorily light a user's path in the hallway while minimally lighting the hallway walls in a first context, and selectively illuminate paintings hung on the hallway walls (e.g., spotlight the paintings) while minimally lighting the hallway corridor in a second context. In a second example, as shown in FIG. 15, the same lightbulb 100 can provide downlight for a user reading a book on the couch in front of the television in a first context, or provide ambient backlight directed away from the television for the same user in the same location. In a third example, as shown in FIG. 16, the same lightbulb 100 can simultaneously provide light having a first set of parameters to a first geographic region, and provide light having a second set of parameters to a second geographic region. In a specific example, the lightbulb 100 can flash light, in synchronization with flashes on a television, toward a first region of a couch, while concurrently providing a substantially constant light (e.g., for reading) toward a second region of the couch distinct from the first region. However, the lightbulb 100 can selectively operate the light emitting elements 500 in any other suitable manner in response to determination of any other suitable context. The lightbulb 100 can additionally confer any other suitable benefit.

The lightbulb 100 preferably enables a plurality of light parameters to be automatically or manually controlled. Examples of controllable light parameters for each lightbulb 100 include: the light direction, which light emitting element 500 is lit, the emission pattern for each light emitting element 500, the number of concurrently lit light emitting elements 500, the pattern of concurrently lit light emitting elements 500', the parameters of the emitted light (e.g., hue, saturation, brightness, correlated color temperature, color rendering index, attenuation, etc.), the shape of the emitted light (e.g., conical, beam, etc.), the quality of the emitted light (e.g., collimated, disperse, etc.), or include any other suitable light parameter.

The parameters of a plurality or population of lightbulbs 100 can additionally be automatically or manually controlled to achieve a desired illumination effect within a physical space 20 or on an illumination target 60. The population of lightbulbs 100 preferably includes all lightbulbs 100 within a physical space 20 (e.g., within a room, within a house, etc.), but can alternatively include all lightbulbs 100 arranged on the same sub-circuit, all lightbulbs 100 controlled by the same switch, all lightbulbs 100 connected to the same local area network (LAN), lightbulbs 100 located in geographically disparate locations, lightbulbs 100 associated with the same user account, or be any other suitable population of lightbulbs 100. Examples of lightbulb population parameters that can be controlled include: which lightbulb 100 has lit light emitting elements 500, the parameters of light emitted by each lightbulb 100, when each lightbulb 100 is operated (e.g., relative timing between lightbulbs 100), the spatial light focus of the lightbulb population (e.g., wherein beams of low light from a first and second lightbulb 100 cooperatively illuminate a single volumetric region with a higher intensity than the emitted light, an example of which is shown in FIG. 17), or be any other suitable population parameter.

The light emitting element 500 of the lightbulb 100 functions to emit electromagnetic radiation or signal 30, such as light. The light emitting element can be an LED, OLED, solid-state light emitting element, or be any other suitable light emitting element. The lightbulb 100 preferably includes a plurality of light emitting elements 500, but can alternatively include a single light emitting element 500 or any suitable number of light emitting elements 500. Each light emitting element 500 can be independently controlled, such that each light emitting element 500 operates independently from the other light emitting elements 500. Alternatively, a group of light emitting elements 500 (e.g., a cluster or subset of the light emitting elements 500) can be independently controlled, such that the group of light emitting elements 500 can operate independently from the other of the light emitting elements 500. Each controlled subset (e.g., individual light emitting element 500 or cluster) is preferably wired in parallel relative to other controlled subsets of the lightbulb 100, but can alternatively be wired in series, wired in a combination of in parallel and in series, or be wired in any other suitable manner. The controlled subsets of the lightbulb 100 are preferably controlled by the lightbulb 100 processor 700, but can alternatively be controlled by a remote computing system 72 (e.g., server system), external device 30 (e.g., mobile device 70, appliance, etc.), or by any other computing system.

Figure 10:
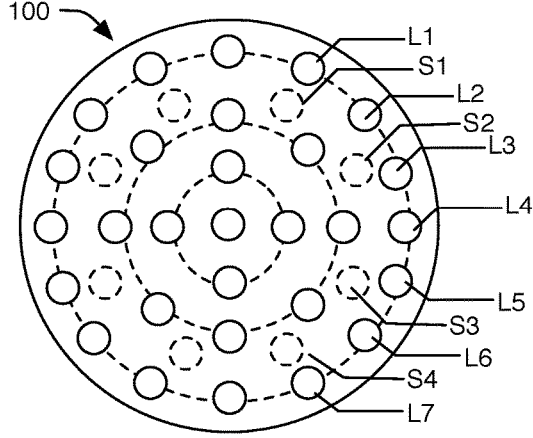
FIG. 10 is a schematic representation of an example of light emitting element and sensor indexing (indicated by L and S, respectively).

Each controlled subset is preferably identified by a locally unique identifier (e.g., with respect to the lightbulb 100), such that the controlled subset can be individually controlled, but can alternatively be identified by a globally unique identifier, be identified by a nonunique identifier, or be identified in any other suitable manner. The identifier can be an index value (e.g., number), a position on the lightbulb 100 (component position, light emitting element position, etc.), or be any other suitable identifier. When an index is used, the index value for adjacently positioned subsets are preferably sequential (e.g., as shown in FIG. 10), but the subsets can alternatively be randomly or otherwise indexed, independent of the respective controlled subset position on the lightbulb 100. The identifiers for each subset is preferably stored by the lightbulb 100, but can alternatively be stored by a remote computing system (e.g., server system), external device 30 (e.g., mobile device 70, appliance, etc.), or other computing system.

Figure 3:
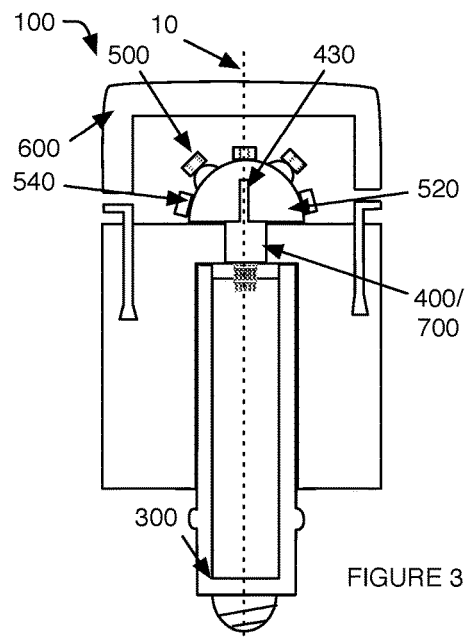
FIG. 3 is a cutaway schematic representation of a third example of the lightbulb, wherein the lightbulb includes a substrate with protrusions.
Figure 4:
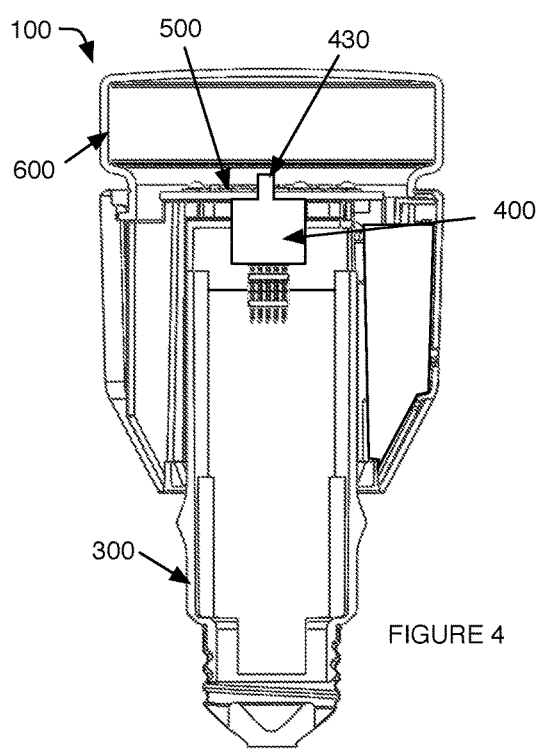
FIG. 4 is a cutaway schematic representation of a fourth example of the lightbulb.
Figure 8:
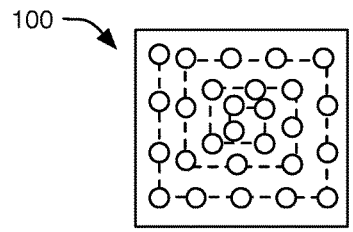
FIG. 8 is an end-on, schematic representation of an example of light emitting element arrangement on the substrate in a spiral pattern.
Figure 9:
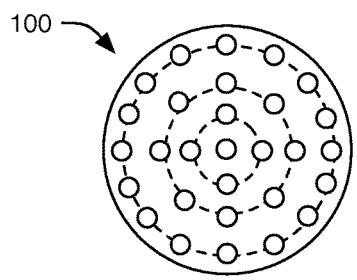
FIG. 9 is an end-on, schematic representation of an example of light emitting element arrangement on the substrate in a concentric pattern.

The controlled subsets are preferably mounted in fixed positions on the lightbulb 100, but can alternatively be mounted in movable positions or be otherwise affixed to the lightbulb 100. The light emitting elements 500 are preferably mounted to a substrate 520, which is mounted to a lightbulb housing 300, but the light emitting elements 500 can alternatively be mounted to any other suitable lightbulb component. The light emitting elements 500 can be mounted on one or more broad faces of the substrate 520, along one or more sides of the substrate 520, or be mounted along any other suitable portion of the substrate 520. The substrate 520 can be substantially flat, curved, polygonal, or have any other suitable configuration. The substrate 520 can additionally or alternatively include one or more protrusions (e.g., as shown in FIG. 3), divots, or other feature, wherein one or more controlled subsets are arranged on each feature. Alternatively, the substrate 520 can be substantially featureless. The light emitting elements 500 can be mounted in an array, in concentric rings (e.g., circles, rectangles, etc.; example shown in FIG. 9), in a spiral (e.g., circular spiral, logarithmic spiral, square spiral, etc.; example shown in FIG. 8), in a boustrophedonic pattern, randomly positioned, or be mounted in any other suitable pattern.

In some variants, the lightbulb 100 can additionally include a pivoted support 560 mounted to the light emitting element 500 that functions to selectively position the light emitting element 500 in one of a predetermined set of positions. In other variants, the light emitting elements 500 can be statically retained relative to the lightbulb base 360, housing 300, or other component, and exclude a pivoted support 560. The pivoted support 560 can rotate the light emitting element 500 about a rotational axis (e.g., rotate the light emitting element 500 45 degrees, 90 degrees, 180 degrees, 360 degrees, etc.), actuate the light emitting element 500 along an axis (e.g., along the lightbulb 100 longitudinal axis 10, along a lightbulb 100 radial axis, etc.), or otherwise position the light emitting element 500. The rotational axis can be the lightbulb 100 longitudinal axis 10, an axis parallel to the lightbulb 100 longitudinal axis 10, or an axis at a non-zero angle, such as 90 degrees, to the lightbulb 100 longitudinal axis 10, or be any other suitable rotational axis.

The pivoted support 560 is preferably mounted to the substrate 520, but can alternatively be mounted to individual controlled subsets (e.g., wherein the substrate 520 can be formed from multiple components), groups of controlled subsets, or be mounted to any other suitable set of light emitting elements 500. The pivoted support 560 is preferably mounted at the other end to the lighting housing 300 or base 360, but can alternatively be mounted to any other suitable component.

The pivoted support 560 preferably actuates the light emitting elements 500 relative to the base 360 of the lightbulb 100, but can alternatively actuate the light emitting elements 500 relative to the lightbulb housing 300, the lightbulb 100 diffuser boo, or any other suitable lightbulb component. Alternatively or additionally, the pivoted support 560 can actuate the light emitting elements 500 relative to an external reference point 22 (e.g., wherein the pivoted support 560 rotates the light fixture 361). The pivoted support 560 can be active (e.g., driven by a motor, electromagnet, or other actuation mechanism) or passive. The pivoted support 560 can additionally include a position sensor that measures the position (e.g., angular position, radial position, etc.) of the light emitting element 500 or substrate 520. Examples of the position sensor include a rotary sensor (e.g., an optical encoder, magnetic encoder, capacitive encoder, mechanical encoder, geared encoder, battery-powered encoder, self-powered multi-turn encoder, etc.), linear encoder (e.g., optical, magnetic, capacitive, inductive, eddy current, etc.), or be any other suitable encoder. The pivoted support 560 can be a gimbal system, a ball and joint, a knuckle joint, a turnbuckle, a pin joint, a cotter joint, or any other suitable joint; a scissor lift, linear actuator, or any other suitable actuation mechanism.

The position of each controlled subset on the lightbulb 100 is preferably known and stored in association with the respective identifier, but can alternatively be otherwise determined. The subset position for each subset on the lightbulb 100 can be determined by the manufacturer, automatically by the lightbulb 100, by an external device 30 (e.g., a mobile device 70 or appliance), or be determined by any other suitable system. The subset position for each subset is preferably stored by the lightbulb 100, but can alternatively be stored by a remote computing system (e.g., server system), external device 30 (e.g., mobile device 70, appliance, etc.), or other computing system.

The position of each controlled subset is preferably a position relative to a reference point on the lightbulb 100 (lightbulb 100 reference point), but can alternatively be a location within a grid, wherein each grid intersection is a known, fixed distance from the next grid intersection, or be otherwise determined. The lightbulb 100 reference point can be a real reference point or an imaginary reference point. The lightbulb 100 reference point can be a light emitting element 500 (e.g., a first light emitting element 500), a controlled subset, a sensor 540 (e.g., a light sensor), a notch on the lightbulb 100, a lightbulb longitudinal axis 10, a position determined by a rotary encoder, or be any other suitable reference point. The reference point is preferably static, but can alternatively move, wherein the lightbulb 100 can track the new reference point position and determine new position coordinates for each light emitting element 500.

The light emitting elements 500 can be LEDs (light emitting diodes), OLEDs (organic light emitting diodes), PLEDs (polymer LEDs), solid-state lighting, LECs (light emitting electrochemical cells), other electroluminescent lighting, lasers, bioluminescent lighting, chemoluninescent lighting, fluorescent lighting, gas discharge lighting, phosphorescent lighting, ESL lighting, incandescent lighting, or be any other suitable component capable of emitting electromagnetic or blackbody radiation 30. The radiation 30 emitted by the light emitting elements 500 can be visible or invisible, and can include the entire visible spectrum, portions of the visible spectrum (e.g., red, green, and blue; deep red; etc.), portions of the invisible spectrum (e.g., IR, etc.), or include any other suitable portion of the electromagnetic spectrum.

Each light emitting element 500 of the lightbulb 100 is preferably substantially identical, but can alternatively be different. In one variation, the light emitting elements 500 are all capable of emitting the same plurality of colors (e.g., white only, blue, red, and green, full color, etc.) and/or be the same type of light emitting element 500 (e.g., be RGB LEDs). In a second variation, the light emitting elements 500 are grouped into clusters, wherein each cluster is independently controllable and includes the same combination of light emitting elements 500. For example, each cluster can include a red, blue, and green light emitting element 500. In a third variation, the majority of the light emitting elements 500 (e.g., 90%, 75%, etc.) can be substantially similar (e.g., emit the same colors, include substantially the same group of light emitting elements 500, etc.), while a minority of light emitting elements 500 can have different properties (e.g., be a different type of light emitting element 500, emit light at a different frequency, such as deep red, etc.). For example, the majority of light emitting elements 500 can be white LEDs, but include one or more (e.g., one, two, five, etc.) deep red LEDs or IR LEDs. However, the lightbulb 100 can include any other suitable set of light emitting elements 500 arranged and controlled in any other suitable manner.

The set of light emitting elements can additionally include a set of dividers that separate light emitting elements or controlled subsets. The dividers preferably separate adjacent, individually indexed controlled subsets, but can alternatively separate adjacent groups of controlled subsets or be arranged in any other suitable position. Alternatively, the lightbulb can exclude dividers, such that the physical space between adjacent controlled subsets is substantially unobstructed. The divider can be opaque, transparent, translucent, or have any other suitable optical property. The divider optical properties can be fixed or adjustable (e.g., adjusted by applying a variable voltage to the divider). The divider can extend a portion of the distance between the adjacent controlled subsets (e.g., be half length), extend along the entirety of the distance between the adjacent controlled subsets, or have any other suitable length. The divider can extend a portion of the distance from the substrate to the diffuser or outer covering (e.g., be half height), extend the full distance between the substrate and the diffuser, or have any other suitable height. However, the divider can have any other suitable dimension. The divider can be formed between channels defined within the substrate 520 (e.g., wherein the light emitting elements can be arranged within the channels), defined by protrusions extending from the substrate, or be otherwise defined.

Figure 5:
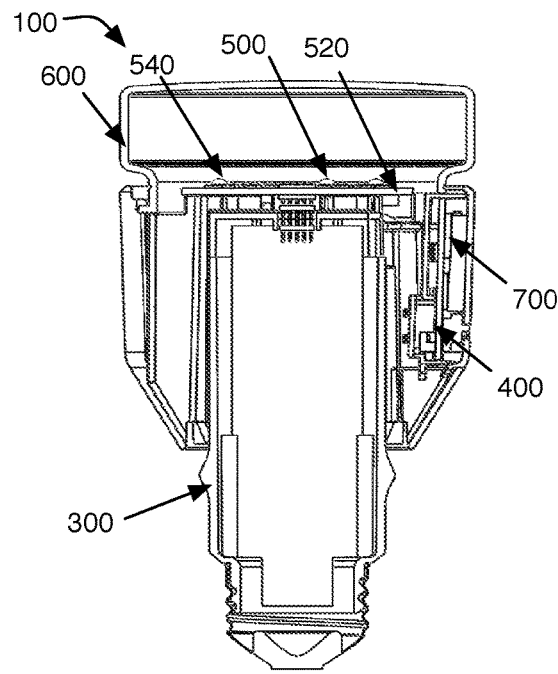
FIG. 5 is a cutaway schematic representation of a fifth example of the lightbulb, wherein the processor and communications module are arranged on the side of the lightbulb.
Figure 6:
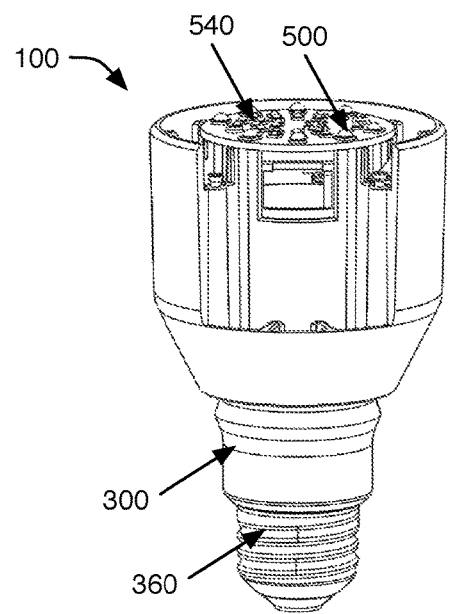
FIG. 6 is a perspective schematic representation of a sixth example of the lightbulb.

The communication module 400 of the lightbulb 100 functions to communicate data between the lightbulb 100 and a secondary device. The secondary device can be a LAN node (e.g., a router), a second lightbulb 100, a mobile device 70 associated with a user (e.g., a smartphone, tablet, smartwatch, etc.), a connected appliance (e.g., a television, switch, etc.), or be any other suitable secondary device. The communication module 400 can support wireless and/or wired communication. The wireless communication module 400 preferably includes a transceiver, but can alternatively be a transmitter or a receiver. Additionally or alternatively, the wireless communication module 400 can be a router. The communication module 400 preferably supports one or more communication protocol standards, but can alternatively support any other suitable communication protocol. The communication module 400 can be mounted on the substrate 520, mounted to the processor board, mounted to a separate and distinct board, mounted to the lightbulb housing, or be mounted to any other suitable lightbulb component. The wireless communication module 400 preferably includes an antenna 430 electrically connected to the processor 700 of the lightbulb 100, and can additionally include intervening circuitry that supports the communication protocol. In one variation, the antenna 430 extends through the substrate 520 (e.g., along the longitudinal axis 10 of the lightbulb 100), such that the substrate 520 can rotate about the antenna 430 in articulating variants. In a second variation, the antenna 430 extends along a radial or lateral portion of the lightbulb housing 300 (e.g., as shown in FIG. 5). However, the antenna 430 can be otherwise arranged. The lightbulb 100 can include one or more communication modules 400, wherein different modules of the plurality can support the same or different communication protocols. The communication protocol can be WiFi, WiMAX, mesh, zigbee, Z-WAVE, wireless USB, UWB, thread, IR, US, radio, cell, GPS, satellite, NFC, RF, Bluetooth, microwave, modulated light, powerline, Ethernet, coaxial cable, ITU-TG.hn, twisted pair wire, optical fiber, or be any other suitable communication protocol.

The processor 700 of the lightbulb 100 functions to operate the light emitting elements 500 according to control instructions 50. The control instructions 50 can be received from the secondary device through the communication module 400, retrieved from on-device storage (e.g., volatile or non-volatile lightbulb 100 memory), automatically generated by the processor 700 based on sensor measurements or received information, or be determined in any other suitable manner. The processor 700 can additionally or alternatively index the light emitting elements 500, selectively control the light emitting elements 500 based on the respective index value or light emitting element position, determine the gravitational or rotational position of the lightbulb 100 (e.g., a reference point on the lightbulb 100) relative to an external reference point 22 (e.g., by progressing the lightbulb 100 through an orientation pattern), determine the occurrence of contextual events and operate the light emitting elements 500 based on control instructions 50 associated with the contextual events, or otherwise operate the lightbulb 100. The processor 700 can additionally store the position of the lightbulb 100 relative to the external reference point 22, such that the processor 700 can repeatedly illuminate the desired illumination target 60 for each determined context. The processor 700 is preferably a CPU, but can alternatively be a microprocessor 700, a GPU, or any other suitable processing unit. The processor 700 is preferably electrically connected to the active components of the lightbulb 100 (e.g., light emitting elements 500, communication module 400, pivoted support 560, sensors 540, etc.), but can alternatively be connected to a subset of the active components, or be connected to any other suitable set of components. The processor 700 is preferably mounted to the substrate 520, but can alternatively be mounted to the communication module 400 or be mounted to any other suitable portion of the lightbulb 100.

Figure 2:
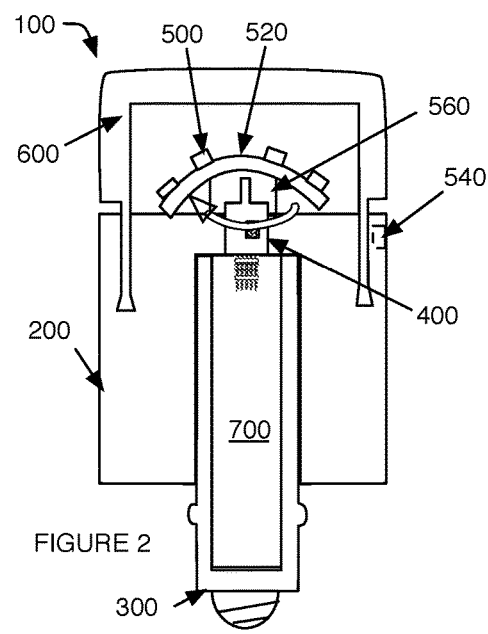
FIG. 2 is a cutaway schematic representation of a second example of the lightbulb, wherein the lightbulb includes a pivotal support and an exposed sensor.

As shown in FIGS. 1 and 2, the lightbulb 100 can additionally include a set of sensors 540 that function to measure lightbulb 100 parameters and/or ambient environment parameters. The sensors 540 are preferably arranged on the substrate 520 (e.g., on the same, adjacent, or opposing face as the light emitting elements 500), but can alternatively be arranged along the housing 300 (e.g., as shown in FIG. 2), the diffuser 600, the base 360, or be arranged along any other suitable lightbulb component. The sensors 540 are preferably electrically connected to the processor 700, but can alternatively be electrically connected to the communication module 400 or be otherwise connected. Examples of sensors 540 that can include light sensors, positioning systems, orientation sensors, power sensors, sound sensors, or include any other suitable sensor. Light sensors can include ambient light sensors (e.g., photometers, photodiodes, photoresistors, phototransistors, etc.), image sensors or cameras (e.g., CCD cameras, CMOS cameras, etc.), optical detectors, or be any other suitable light sensor. In a specific variation, the lightbulb 100 excludes a camera. However, the lightbulb 100 can leverage the feed from an on-board or external camera, or function in any other suitable manner. Positioning systems can include GPS units, cellular triangulation units, trilateration units, optical sensing system, such as a LIDAR system, acoustic sensing system, or be any other suitable positioning system. Orientation sensors can include accelerometers, gyroscopes, digital compasses, or any other suitable orientation sensors. Power sensors can include Hall effect sensors, voltage sensors, or any other suitable sensor capable of measuring a power parameter. Sound sensors can include microphones, transducers, or any other suitable sound sensor. However, the lightbulb 100 can include any other suitable set of sensors.

The lightbulb 100 can additionally include a diffuser 600 and housing 300, which function to encapsulate the lightbulb components. The diffuser 600 can additionally function to diffuse the light emitted by the light emitting elements 500, particularly when the light emitting elements 500 are LEDs (e.g., to increase the diffusion angle). The diffuser 600 is preferably statically coupled to the housing 300 or substrate 520, but can alternatively be actuatable. The diffuser 600 preferably has a substantially static translucency, but can alternatively have a translucency that can be dynamically adjusted (e.g., by the processor 700). The diffuser 600 preferably has a substantially constant translucency over its surface, but can alternatively have a variable translucency over its surface. The diffuser 600 preferably encapsulates the sensors (e.g., the ambient light sensor) within the lightbulb 100 (e.g., as shown in FIG. 1), but can alternatively include apertures or other features to expose the sensors to the ambient environment.

Figure 7:
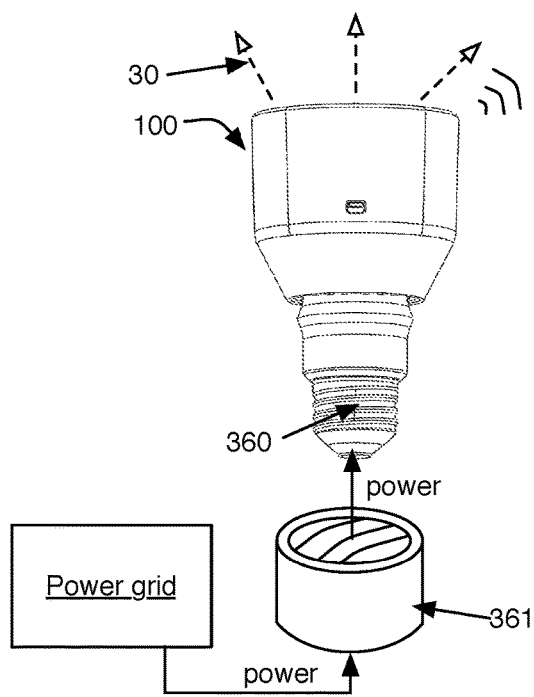
FIG. 7 is a schematic representation of a lightbulb having a standard base that couples to a standard lighting fixture, wherein the lighting fixture is connected to a power grid.

The housing 300 can additionally function to cool the active components and/or function as a structural support for the active components. The power source is preferably a lighting fixture 361, more preferably a standard light fixture (e.g., a ceiling socket or lamp) that is connected to a local circuit, which in turn, is connected to a power grid (as shown in FIG. 7), but can alternatively be a battery, renewable system, or be any other suitable power source. The housing 300 can include a base 360, which functions to electrically connect the lightbulb 100 to a power source. The base 360 is preferably a standard lightbulb base 360 (e.g., an Edison screw, bayonet, bi-post, bi-pin, wedge, fluorescent base 360, etc.), but can alternatively be a custom base 360 or any other suitable type of base 360. Alternatively, the lightbulb 100 can be directly wired into the local circuit or be otherwise powered.

2. Method.

As shown in FIG. 1, the method of spatial lightbulb operation includes determining the position of the lightbulb relative to a physical space S100, detecting a contextual event S200, determining a spatial lighting pattern associated with the contextual event S300, and selectively controlling lightbulb light emitting elements based on the position of the lightbulb and the spatial lighting pattern S400. The method functions to automatically determine the rotational and/or gravitational lightbulb orientation within the space. The method can additionally function to automatically operate the lightbulb to illuminate desired illumination targets with light having a desired set of parameters in response to the occurrence of contextual events. The method is preferably performed with the lightbulb described above, but can alternatively be performed with any other suitable lighting system.

Determining the position of the lightbulb relative to a physical space (lightbulb position) S100 functions to spatially orient the lightbulb. In particular, determining the lightbulb position S100 can include determining the physical position of the lightbulb within the physical space, determining the angular or rotational position of the lightbulb relative to an external reference point, determining the pitch of the lightbulb relative to a gravity vector, and/or determining the lightbulb yaw relative to a gravity vector. Determining the lightbulb position can additionally include: associating a reference point on the lightbulb (lightbulb reference point) with a reference point external the lightbulb (external reference point), such that the relationship can subsequently be used to determine which light emitting elements to operate to illuminate a desired external illumination target with minimal or no additional orientation input. The lightbulb position is preferably automatically determined by the lightbulb, but can alternatively be cooperatively determined (e.g., with the lightbulb) or entirely determined by an external device within the physical space (e.g., a second lightbulb, a mobile device, an appliance, etc.), a remote system 72 outside of the physical space (e.g., a remote server system), or any other suitable system.

Figure 12:
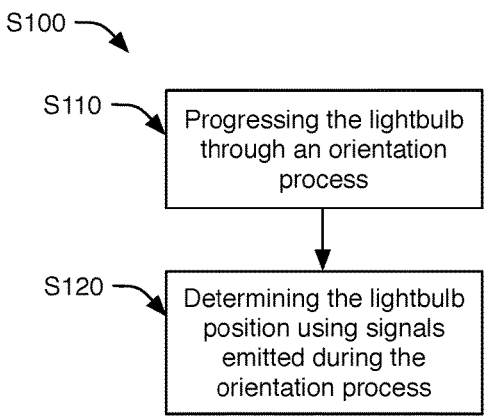
FIG. 12 is a flowchart representation of a variation of determining a lightbulb position relative to a physical space.

In a first variation, determining the lightbulb position S100 includes progressing the lightbulb through an orientation process S110 (e.g., operating the lightbulb in an orientation mode) and determining the lightbulb position by using signals emitted during the orientation process S120, as shown in FIG. 12. However, the lightbulb position can be otherwise determined. In this variation, the lightbulb position can be automatically determined by only the lightbulb, be cooperatively determined by the lightbulb and an external device, or be determined by any other suitable system.

The orientation process functions to operate lightbulb components having known positions, such that the lightbulb or an external device can index the rotational orientation of the lightbulb. The orientation process preferably includes sequentially operating individual controlled subsets in a predetermined mode in a predetermined pattern. The orientation process can additionally include identifying an associative variable for use in automated lightbulb position determination.

Figure 20:
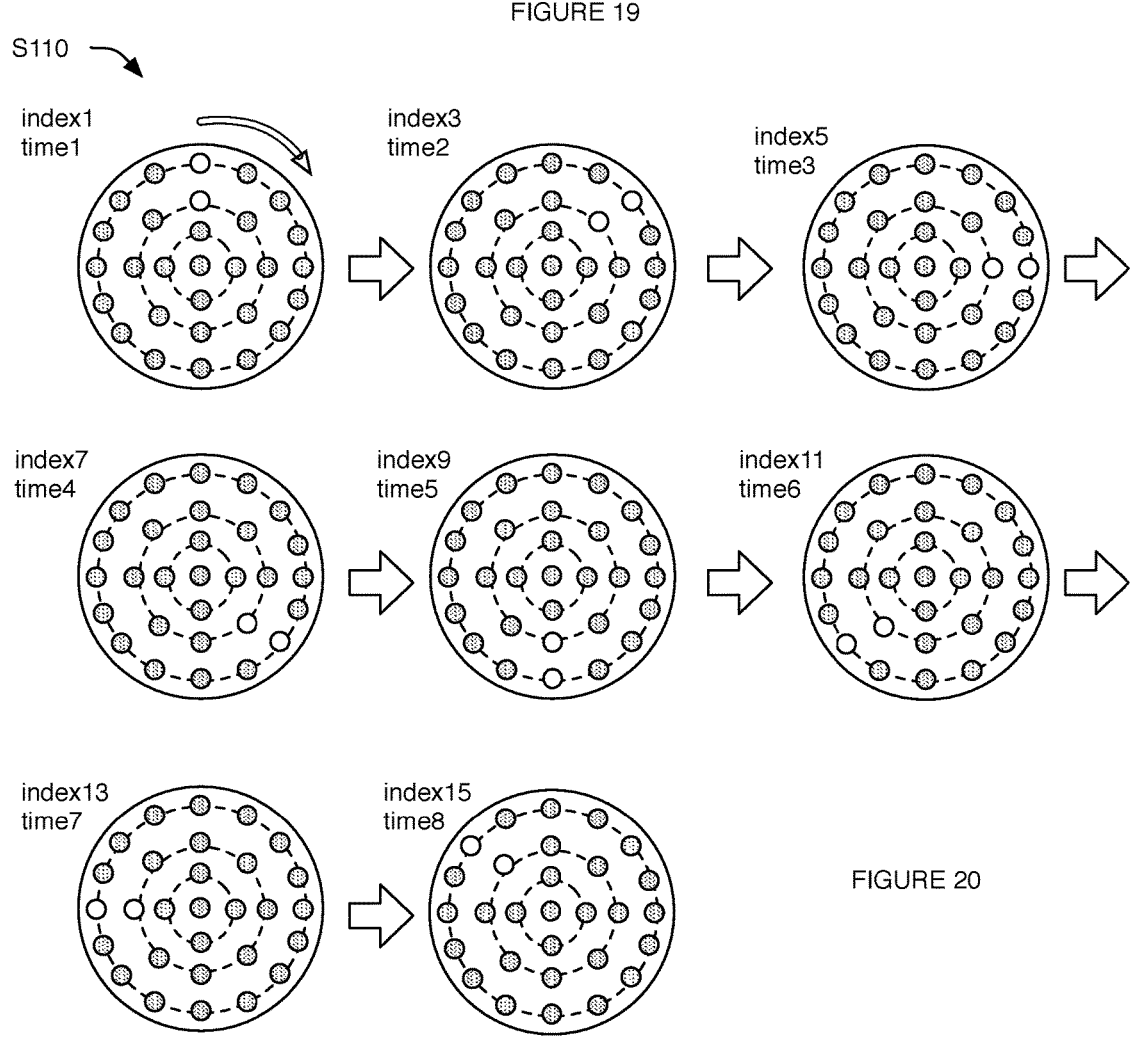
FIG. 20 is a schematic representation of an example of proceeding the lightbulb through an orientation process according to an orientation pattern.
Figure 21:
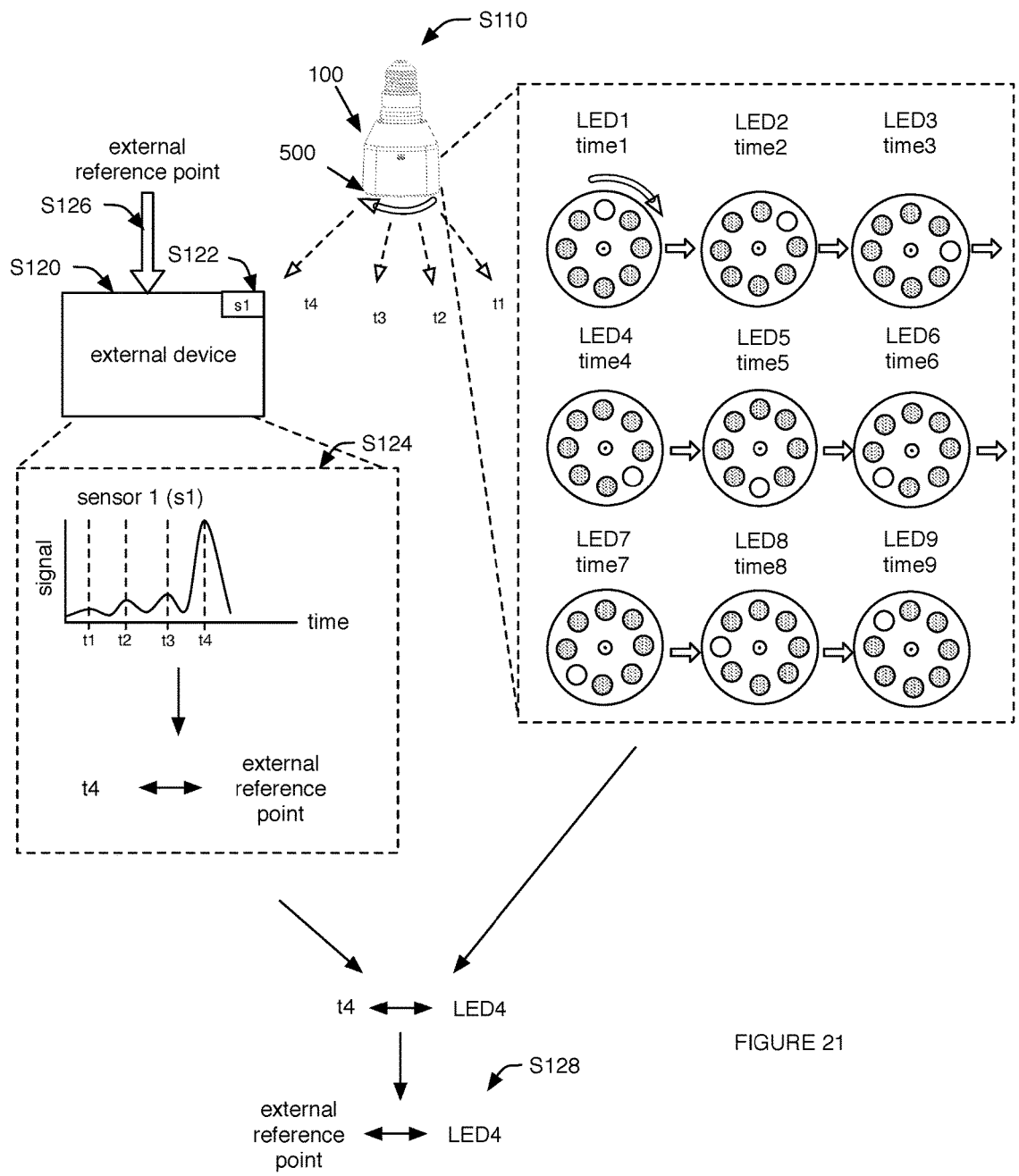
FIG. 21 is a schematic representation of an example of determining the lightbulb position relative to a physical space using an external device.

The controlled subset can be an individual light emitting element (e.g., as shown in FIG. 21), a cluster or group of light emitting elements (e.g., as shown in FIG. 20), or be any other suitable set of lightbulb components. Each controlled subset is preferably individually identified, such that it has a locally unique identifier (e.g., index value), but can alternatively share an identifier with a second controlled subset of the lightbulb, or be otherwise identified. Each controlled subset (or the respective identifier) is preferably associated with a known, stored spatial position on the lightbulb (controlled subset position). The controlled subset position can include the arcuate position, radial position, position along an axis (e.g., along the longitudinal axis), set of coordinates, grid position, or be any other suitable position. The controlled subset positions are preferably stored by the lightbulb 100 (e.g., on volatile or non-volatile memory), but can alternatively or additionally be stored by the remote system 72, external device 30, or by any other suitable system.

The predetermined mode is preferably for a controlled subset, and can be associated with a set of light emitting element operation parameter values, such as values for emitted light parameters (e.g., intensity, color, collinearity, etc.), light emission duration or frequency, or any other suitable operation parameter. Operating the controlled subset in the predetermined mode can include controlling the controlled subset based on the operation parameter values or controlling the controlled subset to meet the operation parameter values. The predetermined mode for each controlled subset is preferably substantially similar in the orientation process (e.g., same brightness or intensity, same color, same dispersion, etc.), but can alternatively be different for each controlled subset. However, the operation parameter values can be otherwise used.

Examples of predetermined modes that can be used include a high emission mode, a low emission mode, a strobe mode, a user-defined mode, or be any other suitable mode. In the high emission mode (500'), the controlled subset can be controlled to emit substantially constant high intensity light (e.g., 100% power, over 50% power, etc.) in a wavelength detectable by a sensor or a human eye (e.g., visible light). Substantially constant light can be light that is perceived as constant by a human eye, light that oscillates at a frequency of 50 Hz or higher (e.g., when PWM is used), or be achieved in any other suitable manner. In the low emission mode, the controlled subset can remain unpowered, be controlled to emit substantially constant low intensity light, be controlled to emit non-visible or low-detectability light, or be controlled to meet any other suitable set of parameter values. In the strobe mode, the controlled subset can be controlled to switch between the high and low emission mode at a predetermined frequency. However, the orientation pattern can specify any other suitable operation mode.

The predetermined pattern can include sequentially operating adjacent controlled subsets (e.g., adjacent light emitting elements), sequentially operating the controlled subsets according to the respective index value (e.g., operating controlled subset 1, then operating controlled subset 2), randomly operating the controlled subsets, sequentially operating every other adjacent controlled subset, concurrently operating multiple controlled subsets (e.g., concurrently operating light emitting elements on a first half of the lightbulb, concurrently operating the outer ring of light emitting elements, etc.), or include any other suitable pattern of light emitting element operation. The lightbulb preferably tracks the identifier of each controlled subset being operated in the pattern and the timestamp at which the respective controlled subset is operated, but can alternatively track any other suitable orientation process parameter.

In one example, the predetermined pattern includes operating a first light emitting element in the high emission mode while operating the remainder of the light emitting elements in a low emission mode, then operating a second light emitting element adjacent the first light emitting element in the high emission mode while operating the remainder of the light emitting elements (including the first light emitting element) in a low emission mode, and repeating the process for each successive light emitting element on the entire lightbulb or lightbulb segment (e.g., perimeter). In a second example, the predetermined pattern can be substantially similar to the first example, except that instead of the second light emitting element being the light emitting element adjacent the first light emitting element, the second light emitting element can be the light emitting element located a predetermined number of light emitting elements away from the first light emitting element. In a specific example, every other light emitting element can be sequentially operated in the high emission mode. In a third example, the predetermined pattern includes concurrently operating a first plurality of light emitting elements (e.g., on a first half of the lightbulb) in a high emission mode while operating a second plurality of light emitting elements (e.g., on a second half of the lightbulb) in a low emission mode, then concurrently operating the second plurality of light emitting elements in the high emission mode while operating the first plurality of light emitting elements in the low emission mode. The first and second pluralities can be separate and distinct, overlap, or be related in any other suitable manner. However, the light emitting elements can be operated in any other suitable pattern during the orientation process.

Identifying an associative variable functions to determine a variable that can be used to link a detected signal with the controlled subset that emitted the signal. Because the position of the controlled subset on the lightbulb is known, this information can be used to determine the rotational orientation of the lightbulb relative to the external reference point.

In a first variation, the associative variable can be a timestamp. For example, a set of timestamps can be recorded and associated with a controlled subset identifier when the respective controlled subset is operated in the predetermined mode. The timestamp can subsequently be used to determine which controlled subset emitted the detected light (e.g., by an external device or the lightbulb).

In a second variation, the associative variable can be the controlled subset identifier. For example, the controlled subset identifier can be communicated as part of the signal emitted by the respective controlled subset (e.g., thorough light modulation). However, any other suitable associative variable can be used.

Determining the lightbulb position using signals emitted during the orientation process S120 functions to determine the rotational orientation of the lightbulb, and can additionally function to determine the lightbulb location within the physical space, the lightbulb yaw, lightbulb pitch, or determine any other suitable lightbulb position parameter.

In a first variation of determining the lightbulb position using the orientation process S120, a device detects the signals emitted during the orientation process and determines the value of the associative variable corresponding to the detected signal. In this variation, determining the lightbulb position using signals emitted during the orientation process S120 preferably includes measuring the incident signal with the device S122, determining the associative variable corresponding to an incident signal measurement of interest S124, determining an external reference point identifier S126, and associating a variable of the controlled subset identified by the associative variable with the external reference point identifier S128, as shown in FIG. 13. However, the lightbulb position can be otherwise determined using signals emitted during the orientation process.

Measuring the incident signal with the device S122 functions to measure the relative strengths of the emitted signal received at the device. The incident signal is preferably measured concurrently (e.g., during) lightbulb progression through the orientation process, but can be measured at any other suitable time. The incident signal is preferably the signal emitted by the lightbulb during the orientation process, such as light or other electromagnetic signals emitted by the lightbulb. However, any other suitable incident signal can be measured.

Figure 22:
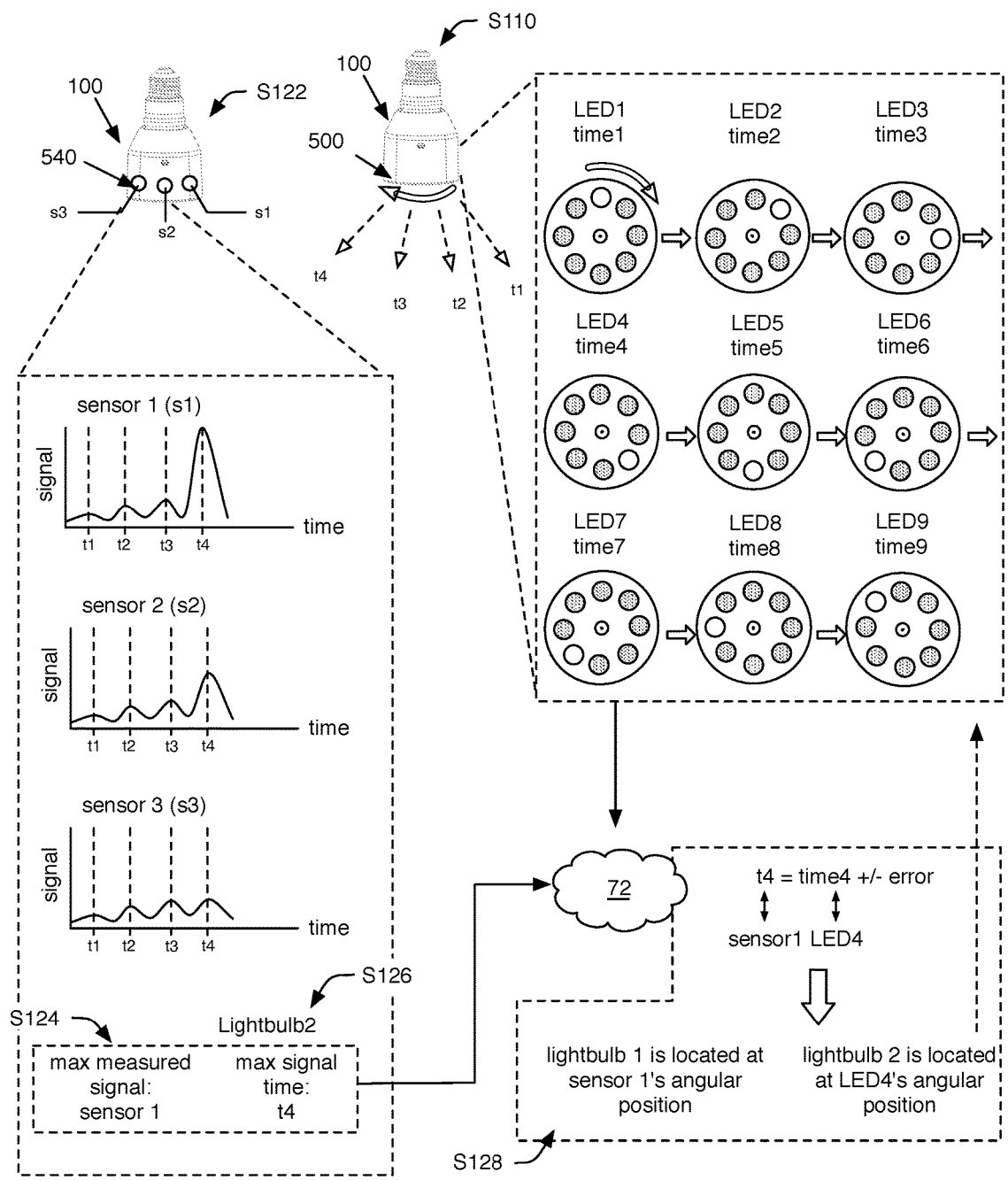
FIG. 22 is a schematic representation of an example of determining the lightbulb position relative to a physical space using a second lightbulb, further including an example of determining the position of the second lightbulb.
Figure 23:
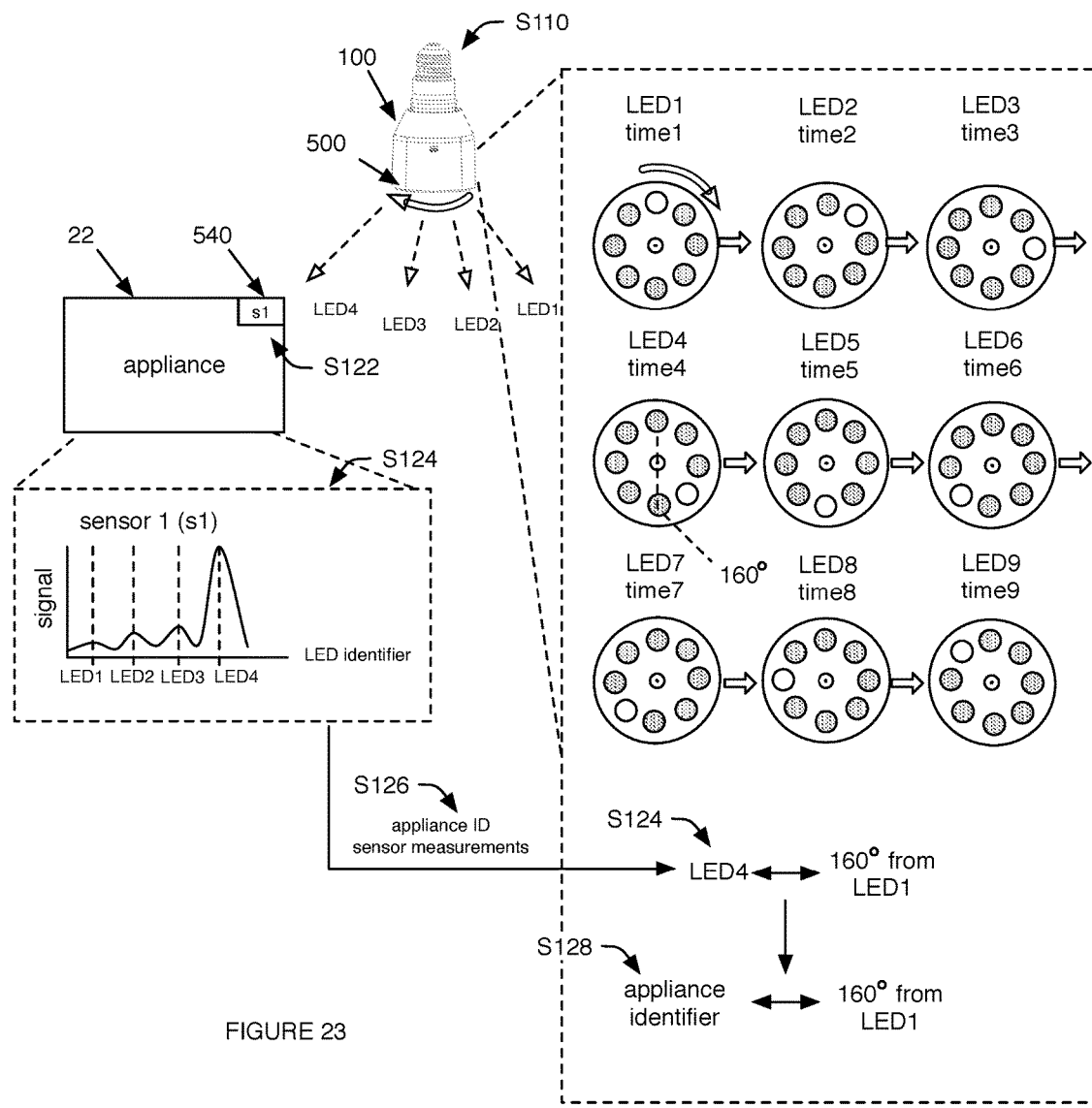
FIG. 23 is a schematic representation of an example of determining the lightbulb position relative to a physical space using a connected appliance.

In a first variation, measuring the incident signal S122 includes measuring the signal with a device is external the lightbulb (external device), as shown in FIG. 21. The external device can be a mobile device, an appliance, a second lightbulb, or be any other suitable external device. The external device can additionally record or determine the associative variable corresponding to each measurement (e.g., record a timestamp, as shown in FIGS. 21 and 22; determine a controlled subset identifier, as shown in FIG. 23; etc.). In this variation, data associated with the measurements, such as raw measurements, processed measurements, measurements of interest, associative values corresponding to the measurements, or other data, can be transmitted from the external device to the system associating the controlled subset variable with the associative variable (e.g., the lightbulb 100, remote system 72, mobile device 70, etc.), in variants where the external device does not perform the association. The data can be communicated through a LAN enabled by an external router, a peer-to-peer network, or through any other suitable communication channel. However, the method can be otherwise performed. In a second variation, measuring the incident signal includes measuring the signal with the lightbulb. However, the incident signal can be otherwise measured.

When the external device is a mobile device (e.g., smartphone, tablet, etc.), the mobile device, more preferably a light sensor of the mobile device (e.g., an ambient light sensor, camera, etc.) or any other suitable mobile device component, can detect the incident light emitted by the lightbulb as the lightbulb progresses through the orientation process. The mobile device can additionally record the timestamp at which each incident light measurement was recorded, determine the controlled subset identifier from the incident light, or determine any other suitable associative variable value. The external reference point identifier can be the absolute or relative geographic location of the mobile device, which can be automatically determined by the mobile device (e.g., the GPS system, cell triangulation system, beacon triangulation system, etc.), or be determined by any other suitable system. The external reference point identifier can be the location of the mobile device during the orientation process, the location of the mobile device measured while the incident light is being measured, the location of the mobile device measured within a threshold time duration of the incident light measurement, the location of the mobile device measured within a threshold time duration of light emission, the location of the mobile device measured within a threshold time duration of the orientation process, be the location of the mobile device entered by the user, or be the mobile device location measured any other suitable time.

Alternatively, the external reference point identifier can be received from a user in association with the orientation process. The external reference point identifier is preferably received from the user at the mobile device and subsequently communicated to the lightbulb or a remote system associated with the lightbulb, but can alternatively be otherwise received. The external reference point identifier can be a geographic location identifier (e.g., venue name, such as "couch," "stove," "preparation station," geographic coordinates, physical object identifier, such as "painting," etc.), an identifier for a second external device (e.g., "television," "oven," "stove," etc.), or be any other suitable identifier. The mobile device is preferably located proximal the external reference point associated with the external reference point identifier when the mobile device detects the incident light, but can alternatively be arranged in another location.

When the external device is an appliance, the appliance, more preferably a light sensor or camera of the appliance but alternatively any other suitable component, can measure the incident signal emitted by the lightbulb as the lightbulb progresses through the orientation process. The appliance can be substantially static (e.g., be a fixture), or can be mobile. The appliance can be a connected appliance having wired or wireless communication capabilities, or be disconnected. Examples of appliances include televisions, ovens, or other fixtures. The appliance can record the timestamp at which each incident light measurement was recorded, determine the controlled subset identifier from the incident light, or determine any other suitable associative variable value. The external reference point identifier can be the appliance identifier (e.g., a descriptor, such as "television 1," an SKU number, a user-specified identifier, or be any other suitable identifier), an example of which is shown in FIG. 23; an appliance geographical location (entered by the user or automatically determined by the appliance); or be any other suitable identifier.

When the external device is a second lightbulb, the second lightbulb, more preferably a light sensor or camera of the second lightbulb but alternatively any other suitable component, can measure the incident signal emitted by the first lightbulb as the first lightbulb progresses through the orientation process. The second lightbulb is preferably arranged within the same physical space as the first lightbulb, more preferably connected to the same sub-circuit as the first lightbulb, but can alternatively be arranged in any other suitable position. The first and/or second lightbulbs can determine whether they are on the same sub-circuit based on the power provision time, based on whether they can communicate with each other using short-range communication protocols, or determine that they are on the same sub-circuit in any other suitable manner.

As shown in FIG. 22, the second lightbulb preferably measures the incident signal at a sensor located on-board the second lightbulb, but can otherwise measure the incident signal. The sensor can be an ambient light sensor (e.g., wherein the signal is light), a microphone (e.g., wherein the signal is sound), or be any other suitable sensor. In one variation in which the second lightbulb light sensor is enclosed within the lightbulb by the diffuser, the second lightbulb is preferably operated in the low emission mode during the orientation process to prevent measurement contamination by secondary light emitted by the second lightbulb. Alternatively, the second lightbulb can operate all or a subset of its light emitting elements in the high emission mode and automatically correct for the measurement contamination. In a second variation in which the second lightbulb light sensor is exposed, the second lightbulb can be operated in any suitable mode. The second lightbulb preferably includes a plurality of sensors, but can alternatively include a single sensor or a pair of sensors. Each sensor can be associated with a sensor identifier and a sensor position on the lightbulb. The sensor positions (spatial orientations) on the second lightbulb are preferably fixed, known, and stored.

The second lightbulb can record the timestamp at which each incident signal measurement was recorded, determine the controlled subset identifier from the incident signal, or determine any other suitable associative variable value. The external reference point identifier can be the second lightbulb identifier, an identifier for a sensor of the second lightbulb (sensor identifier), a second lightbulb geographical location (entered by the user or automatically determined by the second lightbulb), or be any other suitable identifier. In one example, the second lightbulb includes a plurality of light sensors arranged in fixed, known positions on the lightbulb, wherein the external reference point identifier can be the identifier for the sensor that measured the brightest incident light emitted by the first lightbulb.

Additionally or alternatively, as shown in FIG. 22, the second lightbulb can determine its position relative to the first lightbulb. This can enable the first lightbulb to know the angular position of the second lightbulb relative to the first lightbulb, and enable the second lightbulb to know the angular position of the first lightbulb relative to the second lightbulb. In one variation, the second lightbulb can determine which of its sensors is most proximal the first lightbulb. The sensor most proximal the first lightbulb can be the sensor that measured the brightest incident light, the sensor that measured incident light for the longest time duration or for the highest number of controlled subset operations, or be characterized in any suitable manner. In a second variation, the second lightbulb can triangulate the relative position of the first lightbulb based on the stereovision. However, the position of the second lightbulb relative to the first lightbulb can be otherwise determined.

In a second variation, measuring the incident signal S122 includes measuring the signal with the lightbulb, such that the lightbulb can subsequently automatically determine its own position. The lightbulb can emit the light during the orientation process, measure the light reflected off of adjacent surfaces, and automatically determine its position relative to adjacent surfaces based on the incident light. In this variation, the lightbulb preferably includes one or more sensors that measure the reflected light. The sensors are preferably arranged on the lightbulb exterior (e.g., to prevent light measurement contamination), but can alternatively be arranged behind the diffuser or be otherwise arranged. The lightbulb can determine the relative distance of the adjacent surface (e.g., based on the intensity of the reflected light), the curvature of the adjacent surface, the material of the adjacent surface, or determine any other suitable parameter of the adjacent surface. The lightbulb can additionally coordinate with adjacent lightbulbs, such that two adjacent lightbulbs are not concurrently operated in the orientation mode (e.g., to prevent measurement interference). However, the lightbulb can otherwise automatically determine its position relative to adjacent surfaces.

Determining the associative variable corresponding to an incident signal measurement of interest S124 functions to identify the controlled subset (indexing controlled subset) that is spatially related to the external reference point. The incident signal measurement of interest can be the strongest incident signal measured during the orientation process (e.g., brightest or most intense measured light), weakest incident signal measured during the orientation process (e.g., dimmest or least intense measured light), the signal measurement having a value exceeding a threshold value (e.g., measuring light over threshold intensity), or be any other measurement having signal parameters of interest. The associative variable preferably corresponds to the signal measurement of interest, but can be any other associative variable. The associative variable can be a timestamp (e.g., a recordation timestamp at which the incident signal is measured, etc.), a controlled subset identifier, or be any other suitable associative variable. The signal measurement of interest and/or corresponding associative variable can be determined by the device, by the remote system, by the lightbulb, or by any other suitable system. When the signal measurement and/or corresponding associative variable is not determined by the device, the device preferably communicates the measurements (raw or processed) to the processing system. In one example, the timestamp at which the measured incident light exceeds a threshold intensity is identified as the recordation timestamp of interest. The threshold intensity can be determined based on the intensity of the emitted light (e.g., be more than 80% of the emitted light intensity, substantially match the emitted light intensity, etc.), the ambient light intensity prior to orientation process initiation, or based on any other suitable variable value.

Determining an external reference point identifier S126 functions to determine an identifier that can be subsequently used to identify the external reference point, such as for context-related illumination. The external reference point identifier can be received from a user, automatically determined by the device, automatically determined by the lightbulb, or be otherwise determined. The external reference point identifier can be a geographic location, a label, a device identifier, or be any other suitable identifier of the external reference point.

Associating the variable of the controlled subset, identified by the associative variable, with the external reference point identifier S128 functions to spatially relate a lightbulb reference point with the external reference point. The association is preferably stored for use in contextual control. The association can be stored by the lightbulb, remote system, mobile device, or other system. The lightbulb preferably determines which controlled subset is identified by the associative variable, but the controlled subset can alternatively be determined by a remote system, the external device, or by any other suitable system. The recordation associative variable (measured by the external device) corresponding to the signal measurement of interest is preferably matched or otherwise correlated with an orientation associative variable (recorded by the lightbulb during the orientation process), wherein the controlled subset that emitted signals corresponding to the orientation associative variable is preferably the controlled subset associated with the external reference point. In one example, the associative variable is a timestamp. The recordation timestamp corresponding to the brightest light measured by the external device is substantially matched (e.g., matched within a time duration margin of error, such as 0.5 s, 2 milliseconds, or any other suitable time duration margin of error, to accommodate for signal travel time or signal transmission time from the lightbulb to the external device, etc.) to the origination timestamp, wherein the LED that was lit during the origination timestamp can be the controlled subset for which variables are associated with the external reference point. The controlled subset that is associated with the external reference point can be the controlled subset that is proximal (or most proximal) the identified external reference point, but can alternatively be the controlled subset that is distal (or most distal) the identified external reference point or be the controlled subset positioned in a predetermined orientation relative to the external reference point.

The controlled subset variable is preferably associated with an angular position on the lightbulb, such that an angular position of the lightbulb is associated with the external reference point. However, the controlled subset variable can be associated with any other suitable parameter. The controlled subset variable can be the controlled subset identifier, the controlled subset position on the lightbulb, the position of the controlled subset relative to a reference point on the lightbulb (e.g., a notch position), or be any other suitable variable of the controlled subset. The controlled subset variable is preferably stored in association with the external reference point identifier, but can alternatively be otherwise associated with the external reference point identifier. In one example, the fifth indexed LED is associated with a television when the brightest light emitted by the lightbulb, as determined by the television, was emitted by the fifth indexed LED.

In this variation, the method can additionally include determining the absolute location of the lightbulb within a physical space. For example, the position of the lightbulb can be determined based on the angle of the incident light at the mobile device, the incident light parameters (e.g., phase and intensity), the heading of the mobile device (e.g., based on a digital compass), and the angular orientation of the mobile device relative to a gravity vector (e.g., based on the accelerometer). The mobile device parameters can be used to determine the location and orientation of the mobile device, the incident light angle can be used to determine the angular position and direction of the lightbulb relative to the mobile device, and the phase and/or intensity difference between the emitted light and measured light can be used to determine the distance of the lightbulb away from the mobile device. The phase and/or intensity differences can additionally or alternatively be used to determine the yaw, pitch, or other orientation parameter of the lightbulb. Alternatively, these lightbulb orientation parameters can be determined by lightbulb sensors, cooperatively determined by the lightbulb and signals measured by the external device, or otherwise determined.

Figure 18:
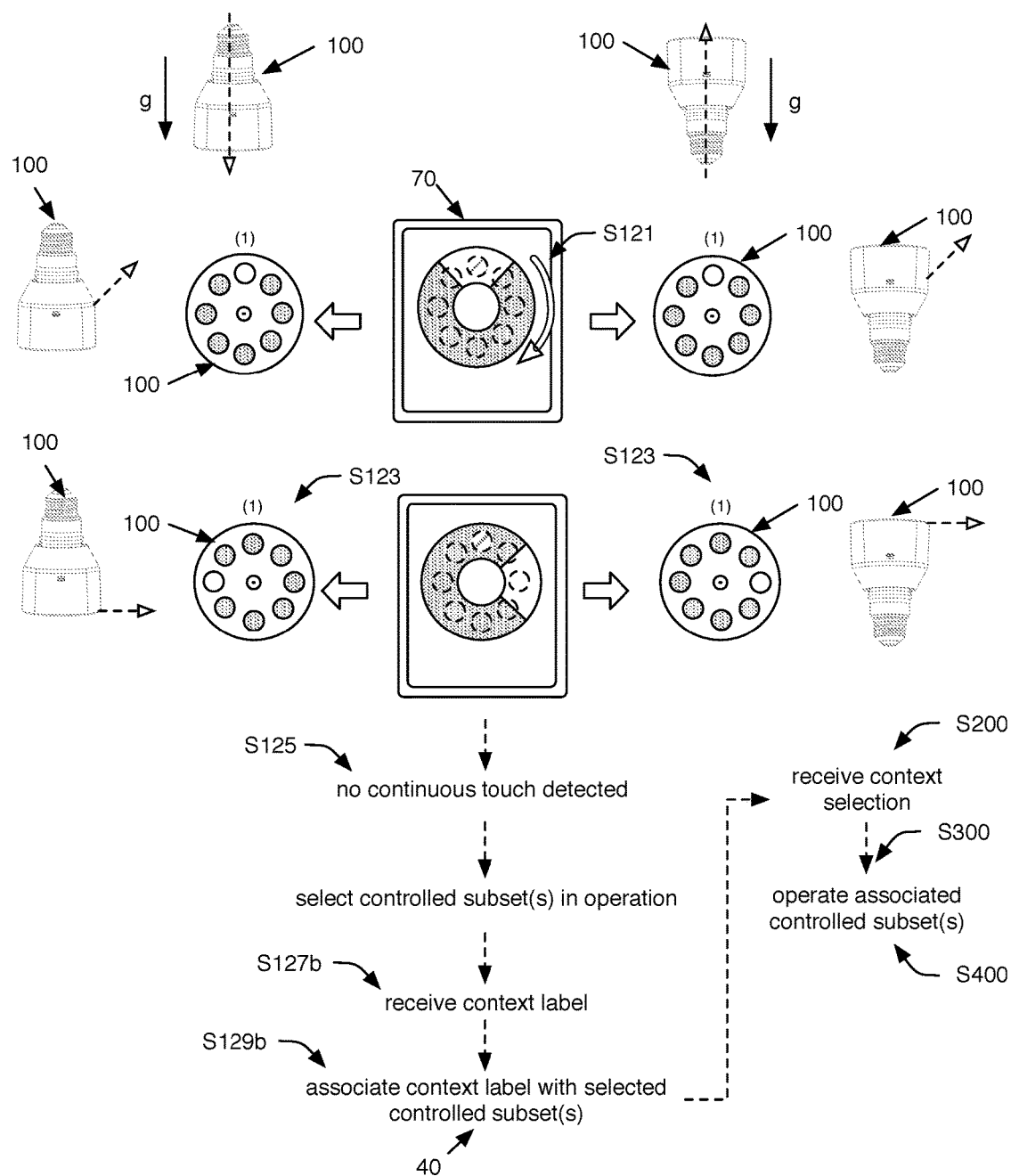
FIG. 18 is a schematic representation of an example of pseudo-manual lightbulb position determination using a graphical representation of the lightbulb, and orientation-dependent lightbulb response.

In a second variation of determining the lightbulb position by leveraging the orientation process S120, the lightbulb position is pseudo-manually determined. In this variation, the user can control which controlled subset is lit during the orientation process, and manually associate an external reference point identifier with the lit controlled subset. The method can include receiving a control instruction from a device associated with a user S121 (e.g., through a logged in user account), controlling the lightbulb based on the control instructions S123, detecting a controlled subset selection event S125, receiving an external reference point identifier S127a (and/or context label S127b), and associating variable(s) of the selected controlled subset(s) with the external reference point identifier S129a (or context label S129b), as shown in FIG. 14. For example, individual controlled subsets (e.g., light emitting elements) of the lightbulb can be sequentially lit (example of S123) as the user scrolls through a complimentary lightbulb representation on the user interface of a mobile device (example of S121) (e.g., by entering a control instruction, such as a light control vector, which can be linear, arcuate, or have any other suitable shape). As shown in FIG. 18, the direction that the controlled subsets are sequentially lit (clockwise or counterclockwise) is preferably determined based on the orientation of the lightbulb relative to a gravity vector, but can be otherwise determined. The orientation of the lightbulb relative to a gravity vector is preferably determined by the orientation sensor of the lightbulb (e.g., accelerometer, gyroscope, etc.), but can be otherwise determined. In response to the lightbulb diffuser being arranged below the base (e.g., when the lightbulb is downward facing), receipt of a clockwise control instruction (e.g., clockwise control vector) can control sequential light emitting elements to be lit in a counterclockwise pattern (e.g., sequentially lit to the left) when viewed end-on from the diffuser. In response to the lightbulb diffuser being arranged above the base (e.g., when the lightbulb is upward facing), receipt of a clockwise control instruction (e.g., clockwise control vector) can control sequential light emitting elements to be lit in a clockwise pattern (e.g., sequentially lit to the right) when viewed end-on from the diffuser. Receipt of a counterclockwise control vector can control the light emitting elements to be lit in the opposite manner. However, the lightbulb orientation relative to a gravity vector can be otherwise accommodated.

When one or more controlled subsets have been selected (e.g., when the user halts control instruction input; when a position confirmation, such as selection of a corresponding controlled subset representation, is received; etc.), the user can enter an external reference point identifier (example of S127a), such as a label (e.g., "painting," "wall," "television," etc.), geographic location, or any other suitable external reference point identifier that will subsequently be associated with the selected controlled subsets. Alternatively, the user can enter a context label (example of S127b), such as "night," "party," or any other suitable contextual label. This can function to store the selected lightbulb parameters (e.g., the parameters of the light emitting elements at the time the context label is received) in association with the context or context label, such that subsequent detection of the respective context can cause the lightbulb to emit light at substantially the same parameters as those selected during the orientation process. The method can additionally include verifying or confirming the selected controlled subsets. For example, the mobile device can verify that the emitted light is being received at the mobile device location using the ambient light sensor of the mobile device. In another example, the mobile device can be controlled to display a query, requesting the user to verify that the emitted light is illuminating the desired illumination target. However, the controlled subset selection can be otherwise verified.

Figure 19:
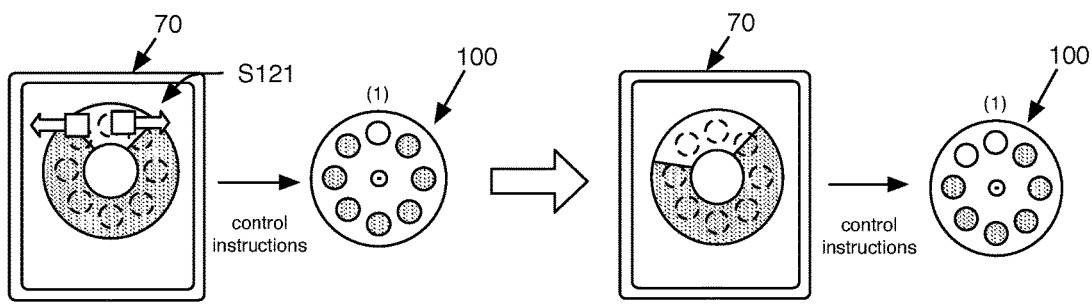
FIG. 19 is a schematic representation of an example of generating control instructions specifying an angular range of light emitting elements to be concurrently lit, control instruction receipt, and selective lightbulb operation based on the control instruction.

In a specific example, as shown in FIG. 19, the user can additionally specify the number of lit light emitting elements (e.g., by entering the number, dragging two fingers apart on the lightbulb representation, etc.), rotate the lit set of light emitting elements about the lightbulb until the lit set of light emitting elements illuminate a desired illumination target (e.g., television, wall, table), and enter a descriptor for the illuminated target (e.g., "television," "wall," "table," respectively), which functions as the external reference point identifier. The external reference point identifier can be stored in association with the controlled subset variable (e.g., position, identifier, etc.) of the selected controlled subset. However, the lightbulb position can be otherwise determined using the orientation process.

In a second variation, determining the lightbulb position includes scanning or imaging the lightbulb environment. The lightbulb environment can be scanned by a LIDAR system, imaged by a camera system, or otherwise recorded. The lightbulb environment can be scanned with an optical sensing system on the lightbulb or with an external optical sensing system. When the latter is used, the scanned coordinates are preferably transformed to lightbulb coordinates. However, the data can be otherwise used. Environmental features, such as walls, furniture, or other fixtures, can be determined based on the images. However, the lightbulb position can be determined using a digital compass (e.g., wherein the lightbulb position relative to external features can be determined based on a virtual map), or be determined in any other suitable manner.

The method can additionally include detecting a contextual event S200, identifying a spatial lighting pattern associated with the contextual event S300, and controlling the lightbulb based on the spatial lighting pattern S400. This enables the lightbulb population to selectively create context-based lighting scenes. For example, as shown in FIG. 15, the lightbulb can selectively highlight the couch during a reading context, and direct light behind the couch during a television or movie watching context.

Detecting a contextual event S200 functions to identify a set of event parameters for which lighting is needed. The contextual event can be supply of power to the lightbulb, user entry into a room, receipt of a startup signal from an appliance, receipt of a context selection, or detection of any other suitable contextual event. User entry into a room can be determined when a mobile device associated with the user wirelessly connects to the lightbulb (e.g., via NFC) or a local area network (LAN). The LAN can be enabled by an external device (e.g., an external router), enabled by the lightbulb or population of lightbulbs (e.g., a Bluetooth network, mesh network, etc.), or be enabled by any other suitable device. Alternatively, user proximity to the lightbulb can be detected by an external device (e.g., a camera, an appliance, etc.), or be detected in any other suitable manner.

Figure 24:
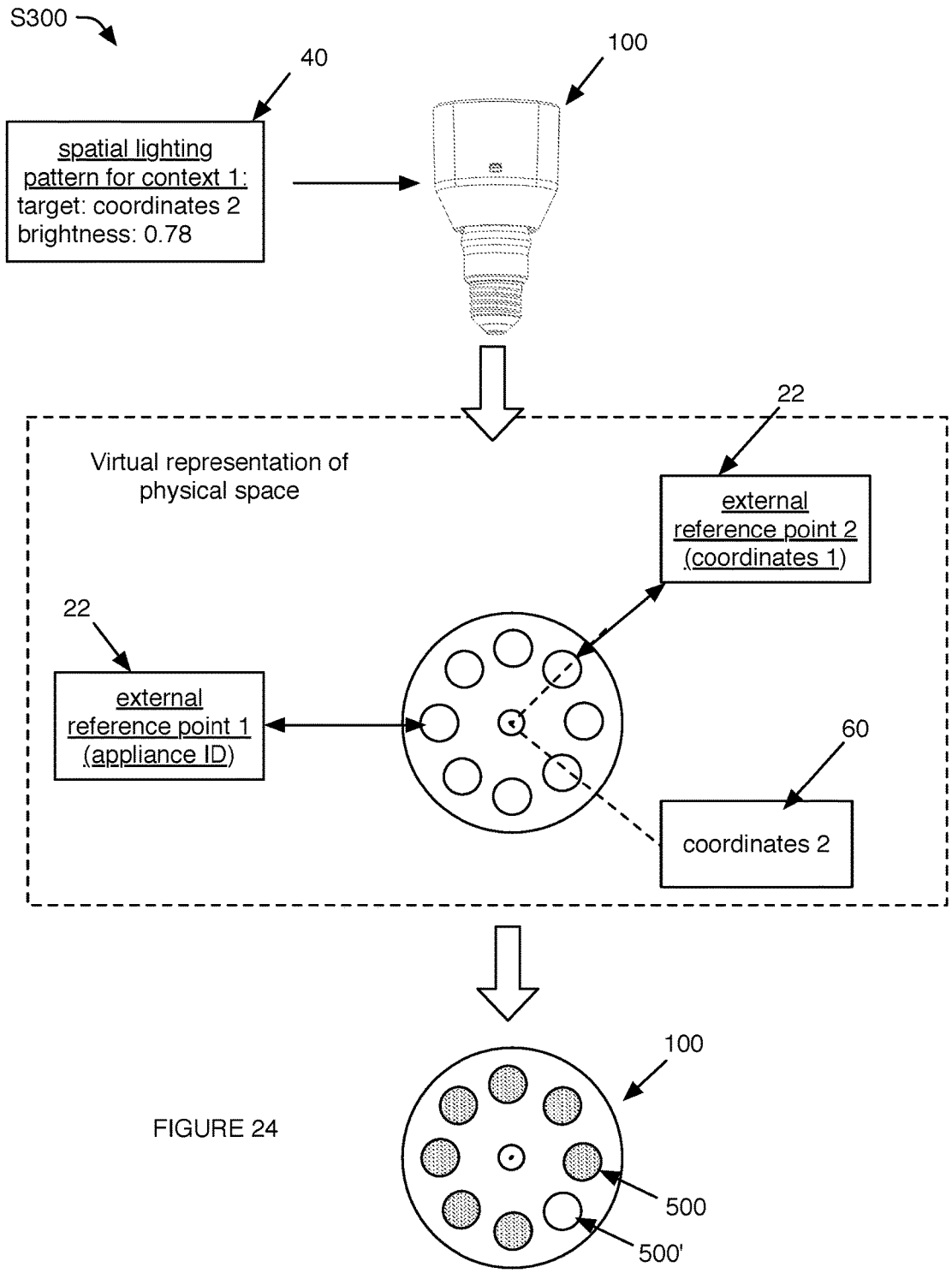
FIG. 24 is a schematic representation of an example of selectively operating a lightbulb based on a spatial lighting pattern.

Determining a spatial lighting pattern associated with the contextual event S300 functions to identify the target illumination scenes or lightbulb operation parameters associated with the context. The spatial lighting pattern 40 can be received from a remote system, retrieved from lightbulb storage, received from a mobile device, or be determined in any other suitable manner. The spatial lighting pattern 40 include a set of operation parameters for each lightbulb within the physical space, a set of operation parameters for each light emitting element, a set of specified illumination targets (e.g., by a previously associated external reference point identifier; by a virtual location in 3D virtual space, as shown in FIG. 24; etc.), a set of illumination parameters for a specified illumination target (e.g., wherein the lightbulb population cooperatively illuminates the illumination target with the illumination parameters, wherein the lightbulb population or other system can determine the operation parameters for each lightbulb to achieve the effect), or include any other suitable set of operation parameters. The spatial lighting pattern 40 can be automatically determined by the plurality of lightbulbs; previously or currently received from a user, user account, or mobile device; be a predetermined pattern associated with the contextual event or selected by a user; be a pattern determined from user population preferences; or be determined in any other suitable manner. In a first example, the user can select a "reading" context, where the lightbulb population can spotlight a region proximal the user mobile device, spotlight a pre-specified reading area, or interact with the physical space in any other suitable manner. In a second example, the user can individually rotate the lit light emitting elements on each lightbulb to illuminate the illumination target. However, the spatial lighting pattern 40 can be otherwise determined.

Controlling the lightbulb based on the spatial lighting pattern S400 functions to execute the spatial lighting pattern. Controlling the lightbulb based on the spatial lighting pattern can include controlling individual light emitting elements based on the spatial lighting pattern and the association between the controlled subset variable and the external reference point. In one example, the lightbulb can automatically illuminate an illumination target, given the illumination target position relative to the external reference point or relative to the indexing controlled subset. The relative position between the target and the reference point can be automatically determined, determined in a virtual 3D space, determined by a mobile device, determined based on the communication signal strength and/or direction between the external reference point and the illumination target, or be otherwise determined. In a specific example, when the illumination target is the external reference point, the controlled subsets associated with the external reference point can be operated to illuminate the target. In a second specific example, when the illumination target is a given number of degrees away from the external reference point, the controlled subsets positioned the number of degrees away from the indexing controlled subset on the lightbulb in the same direction can be operated to illuminate the target. However, the lightbulb can be otherwise controlled. In a third specific example, when the illumination target is a second geographic location, a second lightbulb proximal the second geographic location can be selected and operate to illuminate the target location, region, or volume.

Figure 25:
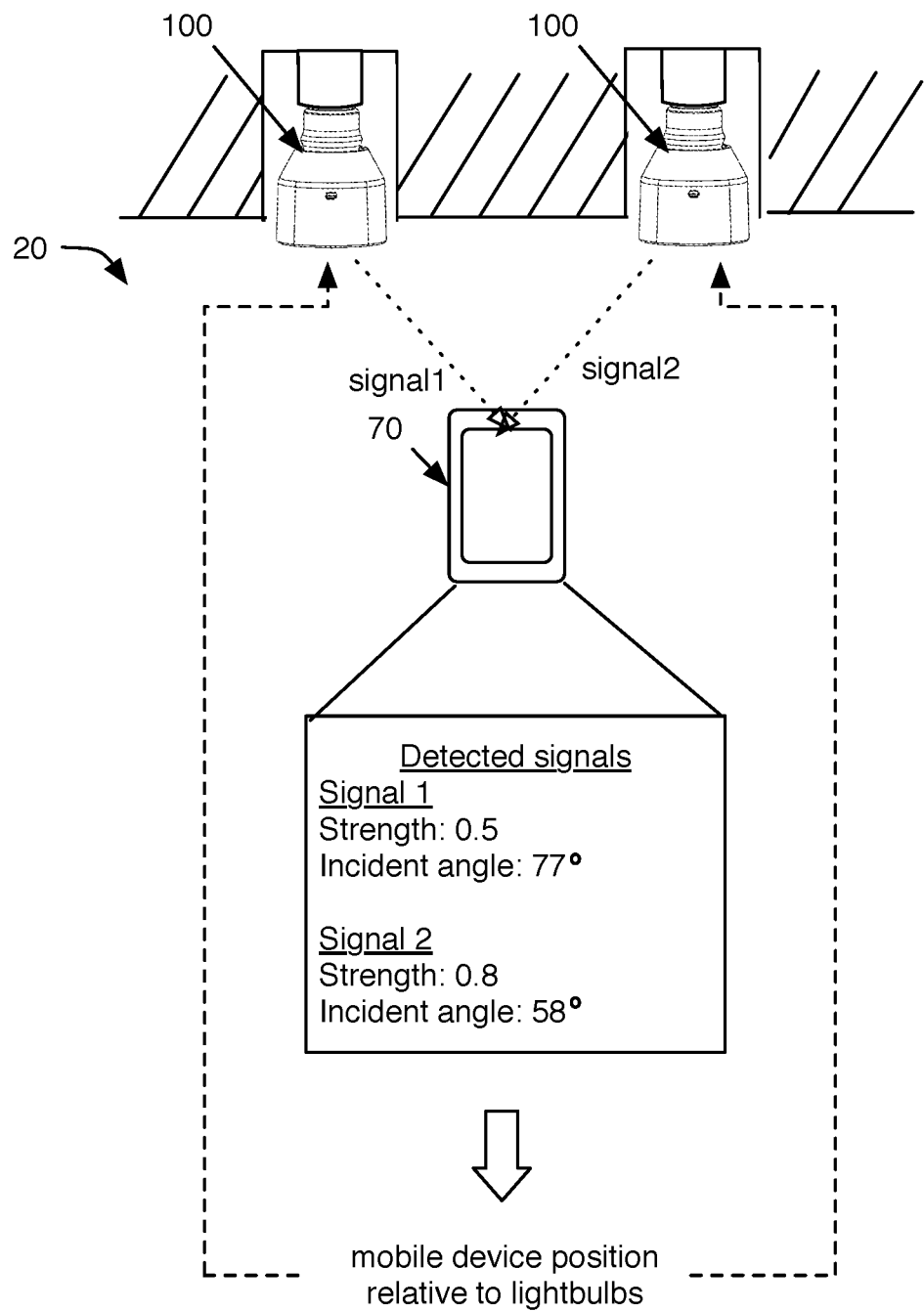
FIG. 25 is a schematic representation of an example of mobile device triangulation.

In one example of the method, the lightbulbs track the user, more specifically the user mobile device, in response to mobile device connection to a short-range communication system of the lightbulb (e.g., beacon, Bluetooth, etc.). In this example, the method selectively controls individual light emitting elements to direct light toward the mobile device physical position, based on the mobile device position and the physical light emitting element position corresponding to the stored light emitting element identifier. The method can include cooperatively identifying a mobile device position relative to a first and second lightbulb, generating control instructions for the first and second lightbulbs based on the mobile device position; and controlling the first and second lightbulbs based on the control instructions. Identifying the mobile device position relative to a first and second lightbulb can include determining the mobile device position through trilateration, receiving the location from the mobile device, determining the mobile device position based on first and second signals emitted by the first and second lightbulbs and received at the mobile device, or be determined in any other suitable manner. In one variation, as shown in FIG. 25, identifying a mobile device position relative to the first and second lightbulbs through trilateration includes: emitting a first nonvisual signal from the first lightbulb; emitting a second nonvisual signal from the second lightbulb; detecting the first and second nonvisual signals at the mobile device; determining the mobile device position based on the received first and second nonvisual signals at the mobile device; generating control instructions for the first and second lightbulbs based on the mobile device position (e.g., based on the position of the mobile device relative to the position of the indexing controlled subsets on the lightbulbs); and controlling light emitting elements proximal the mobile device to cooperatively illuminate the physical region proximal the mobile device. The method can additionally include verifying that the emitted light illuminates the region using the ambient light sensor on the mobile device, and can additionally include adjusting the parameters of the emitted light (e.g., increase or decrease brightness) based on the measured incident light. This verification or adjustment can be performed when the mobile device is in one of a limited set of positions (e.g., horizontal, etc.), be performed at any time, or not be performed at all.

In a second example of the method, as shown in FIG. 15, the spatial lighting pattern backlights the couch, such as when a user is watching the television or watching a movie. In this example, the spatial lighting pattern specifies high emissivity light directed away from the external device (e.g., the television), wherein selectively controlling individual light emitting elements based on the spatial lighting pattern includes operating the light emitting element physically opposing the indexing controlled subset across the lightbulb in the high emission mode (e.g., when the external reference point was the television, and the indexing controlled subset emitted the brightest lights measured by the television). However, a physical region can be otherwise targeted.

Figure 11:
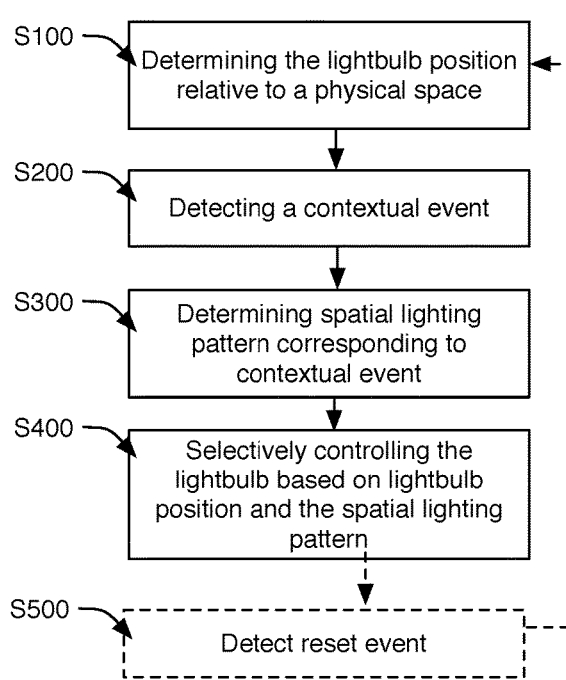
FIG. 11 is a flowchart representation of the method of directional lightbulb operation.

As shown in FIG. 11, the method can additionally include resetting the spatial orientation of the lightbulb in response to detection of a reset event S500. This can function to identify when the lightbulb has been moved, such that the lightbulb position within the physical space should be redetermined. The reset event can be detection of a reset switch toggle (e.g., when the lightbulb reset switch is in a different position than a stored position), actuation of a contact button arranged in or proximal the lightbulb base, detection of lightbulb acceleration above threshold acceleration (e.g., 0.5 m/s$^2$), determination that a second lightbulb's signal is being received at a different sensor of the first lightbulb than that previously receiving the second lightbulb's signal, receipt of a notification from a user device, or be any other suitable reset event. Resetting the spatial orientation of the lightbulb can include re-determining the position of the lightbulb relative to a physical space, such as by initiating the orientation process for the lightbulb. The method can additionally include erasing the previously stored orientation.

An alternative embodiment preferably implements the above methods in a computer-readable medium storing computer-readable instructions. The instructions are preferably executed by computer-executable components preferably integrated with a directional lighting system. The directional lighting system can include an angular orientation system configured to determine the angular position of a directional lighting system reference point relative to an external reference point; a context identification system configured to determine the occurrence of a contextual event; and a directional control system configured to identify an illumination target based on the contextual event, determine the illumination target angular position relative to the directional lighting system reference point and/or the external reference point, and select and control light emitting elements on the directional lighting system to illuminate the target. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method for controlling lightbulb operation, comprising:
   determining a lightbulb orientation for the lightbulb within a venue, the lightbulb comprising a plurality of light emitting elements, each with a predetermined spatial position on the lightbulb;
   determining a spatial lighting pattern for the venue, the spatial lighting pattern comprising a set of light parameters for a target location within the venue;
   identifying a light emitting element from the plurality of light emitting elements based on the lightbulb orientation, the predetermined spatial positions, and the target location; and
   selectively operating the identified light emitting element, based on the set of light parameters, using a processor of the lightbulb.

2. The method of claim 1, wherein the lightbulb orientation within the venue is determined by an external device, external the lightbulb.

3. The method of claim 2, wherein determining the lightbulb orientation comprises:
   emitting a wireless signal from the lightbulb; and
   determining the lightbulb orientation based on an angle of arrival of the wireless signal at the external device.

4. The method of claim 3, wherein the wireless signal comprises light emitted by the light emitting element, wherein the plurality of light emitting elements comprise visible light-emitting elements and non-visible light-emitting elements.

5. The method of claim 1, wherein the spatial lighting pattern is determined by an external device.

6. The method of claim 5, wherein selectively operating the identified light emitting element comprises synchronously operating the identified light emitting element with media playback with the external device.

7. The method of claim 5, wherein the light parameters are transmitted to the lightbulb by a secondary device, separate from the external device.

8. The method of claim 7, wherein the secondary device comprises a second lightbulb.

9. A method for lightbulb control, comprising:
   determining relative positions of each of a set of lightbulbs within a venue;
   receiving a spatial lighting pattern for the venue, the spatial lighting pattern comprising a set of light parameters for a target location within the venue;

automatically identifying a lightbulb from the set of lightbulbs based on the respective relative position and the target location; and selectively operating the identified lightbulb based on the set of light parameters using a processor of the lightbulb.

10. The method of claim 9, wherein the relative position of each lightbulb within the set is determined relative to an external device.

11. The method of claim 10, wherein the relative position of each lightbulb of the set is determined by the external device.

12. The method of claim 11, wherein determining the lightbulb orientation comprises:

emitting a wireless signal from the lightbulb; and determining the lightbulb orientation based on an angle of arrival of the wireless signal at the external device.

13. The method of claim 12, wherein the wireless signal comprises light emitted by the lightbulb, wherein the plurality of light emitting elements comprise visible light-emitting elements and non-visible light-emitting elements.

14. The method of claim 9, wherein the relative positions are manually assigned.

15. The method of claim 9, wherein the spatial lighting pattern is received from a remote computing system.

16. The method of claim 15, wherein the lightbulb is identified from the set based on the spatial lighting pattern by an external device.

17. The method of claim 16, further comprising, at the external device:

generating control instructions based on the set of light parameters; and transmitting the control instructions to the lightbulb.

18. The method of claim 17, wherein the external device comprises a media device.

19. The method of claim 17, wherein the control instructions comprises a first and second instruction for the lightbulb and a second lightbulb, respectively, the method further comprising, at the lightbulb:

wirelessly transmitting the second instruction for the second lightbulb to the second lightbulb.

20. The method of claim 9, wherein selectively operating the lightbulb comprises synchronously operating the lightbulb with media playback on an external device.

* * * * *